United States Patent [19]
Zhou et al.

[11] Patent Number: 5,260,961
[45] Date of Patent: Nov. 9, 1993

[54] SEALED EXCIMER LASER WITH LONGITUDINAL DISCHARGE AND TRANSVERSE PREIONIZATION FOR LOW-AVERAGE-POWER USES

[75] Inventors: Zhengzhuo Zhou, Torrance; Floyd R. Pothoven, Hawthorne; Rodney L. Waters, Torrance, all of Calif.

[73] Assignee: Florod Corporation, Gardena, Calif.

[21] Appl. No.: 885,078

[22] Filed: May 18, 1992

Related U.S. Application Data

[63] Continuation of Ser. No. 607,918, Nov. 1, 1990, abandoned.

[51] Int. Cl.$^5$ .............................................. H01S 3/22
[52] U.S. Cl. ...................................... 372/57; 372/61; 372/59
[58] Field of Search .................. 372/61, 86, 57, 82, 372/92

[56] References Cited

U.S. PATENT DOCUMENTS

| | | | |
|---|---|---|---|
| 3,876,957 | 4/1975 | Thatcher | 372/38 |
| 4,087,763 | 5/1978 | George et asl. | 372/74 |
| 4,258,334 | 3/1981 | McCusker et al. | 372/57 |
| 4,417,342 | 11/1983 | McKee | 372/86 |
| 4,498,183 | 2/1985 | Levatter | 372/57 |
| 4,593,397 | 6/1986 | Proup et al. | 372/82 |
| 4,596,018 | 6/1986 | Gruber et al. | 372/61 |
| 4,611,270 | 9/1986 | Klauminzer et al. | 372/30 |
| 4,611,327 | 9/1986 | Clark et al. | 372/86 |
| 4,763,336 | 8/1988 | Stephens | 372/61 |
| 4,862,886 | 9/1989 | Clarke et al. | 372/70 |
| 4,891,818 | 1/1990 | Levatter | 372/52 |
| 4,951,295 | 8/1990 | Steinführer | 378/86 |
| 4,977,573 | 12/1990 | Bittenson et al. | 372/58 |
| 5,005,180 | 4/1991 | Edelman et al. | 372/57 |

*Primary Examiner*—Léon Scott, Jr.
*Attorney, Agent, or Firm*—Ashen & Lippman

[57] ABSTRACT

The gas enclosure of this laser includes a reservoir but no gas exhaust port—or valve leading to such a port or to ambient. Preferably the enclosure is sealed by an essentially permanent-type seal such as a glassblown seal, and connects with no pump, or valve leading to a pump. System life, in intermittent use or low-repetition-rate continuous use, is over a year without gas replenishment. Opposed metal coatings on the exterior of a discharge capillary tube form preionization electrodes, each extending nearly the entire capillary-tube length. These electrodes are energized to establish a transverse discharge inside the capillary tube, with good uniformity of initial ion density along the capillary tube. The electrodes couple to this discharge capacitively, through the capillary-tube wall, thereby isolating electrode materials against chemical reaction with corrosive gases in the system. Voltage applied longitudinally to internal electrodes, in chambers at the ends of the capillary, establishes the main discharge in this preformed ion population. Ionization uniformity permits lasing action to develop in good synchronism throughout the capillary-tube length, overcoming rapid self-quenching of the excimer to develop a laser pulse from nearly the entire capillary-tube volume.

39 Claims, 14 Drawing Sheets

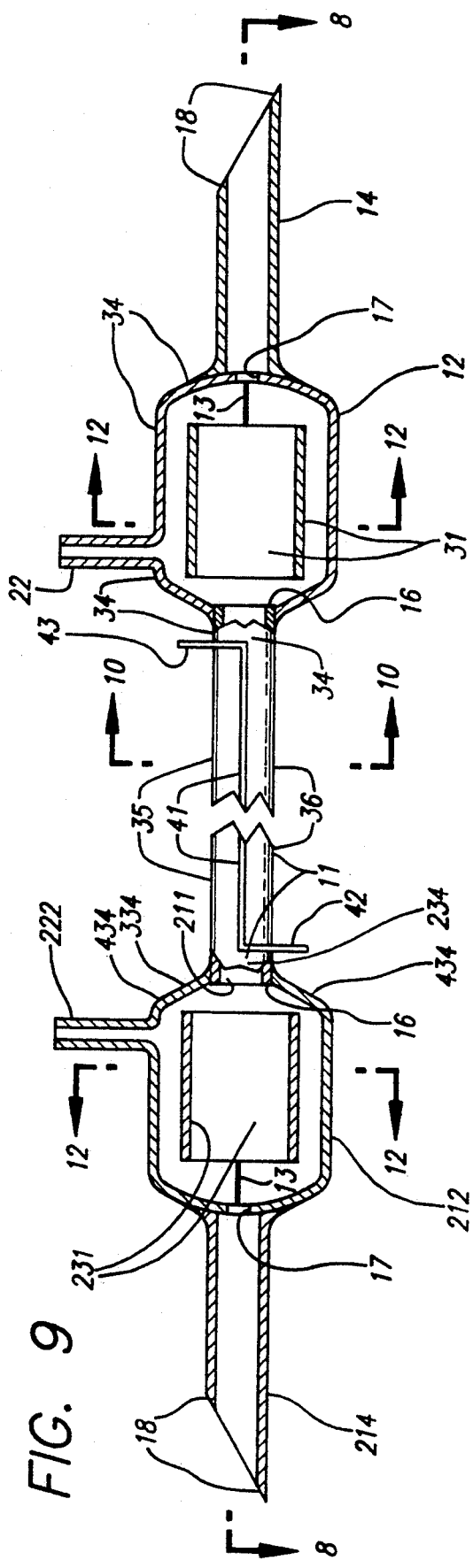
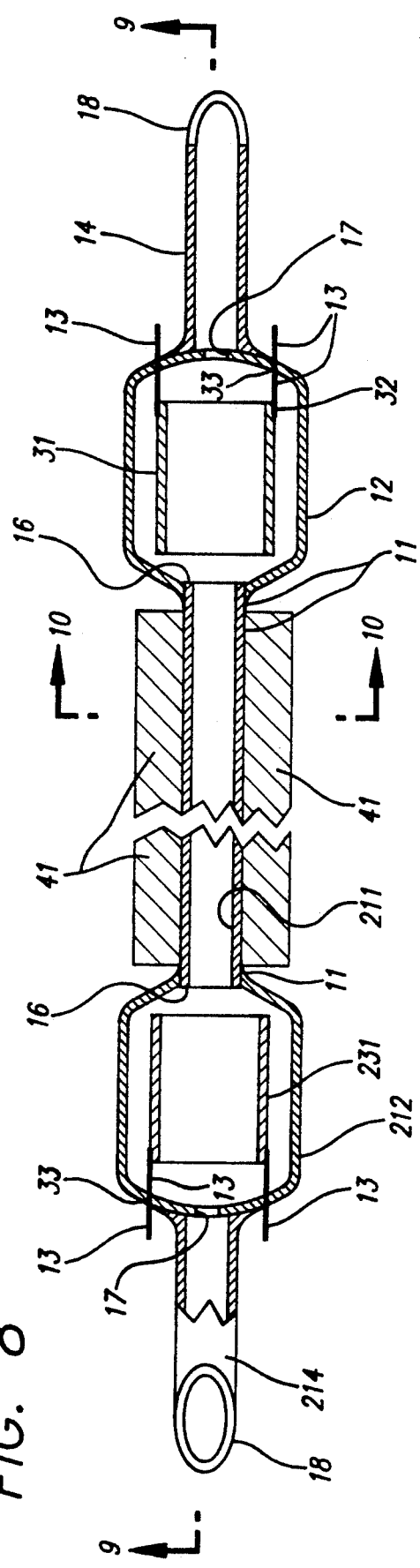
FIG. 9
FIG. 8

SEALED EXCIMER LASER WITH LONGITUDINAL DISCHARGE AND TRANSVERSE PREIONIZATION FOR LOW-AVERAGE-POWER USES

This is a continuation of copending application Ser. No. 07/607,918 filed on Nov. 1, 1990 now abandoned.

BACKGROUND

1. Field of the Invention

This invention relates generally to excimer or "excited dimer" lasers; and more particularly to such lasers that are excited longitudinally by electrical discharges.

2. Prior Art

In recent years the excimer laser has moved swiftly from laboratory experimentation to a commercial product applied in many industrial fields. This development is due to the deep-ultraviolet operating range and associated high photon energy of the excimer laser, and to its high gain, short pulse duration, and freedom from speckle.

Excimers are gas-molecular species that exist only in excited states. Thus the excimer is created and pumped (elevated in energy state) simultaneously, although some further pumping can occur after the species is created. Excitation is provided by an electrical glow discharge in the gas.

Generally at least one member of each dimer is formed from an atom of a rare gas—xenon, argon and krypton have all been used—and the other may be formed from an atom of a halogen gas. Thus diatomic xenon, $Xe_2$, might be employed in an excimer laser; however, particularly useful wavelengths and other operating characteristics arise from use of rare-gas-halogen excimers, especially rare-gas monohalides such as xenon chloride, XeCl, krypton fluoride, KrF, and to a lesser degree argon and xenon fluoride—ArF and XeF.

More specifically, ultraviolet and even vacuum-ultraviolet laser pulses can be derived from rare-gas-halogen species. The energy transitions of interest generally are between strongly attracting bound energy states and strongly repelling unbound ground states.

Excimer lasers typically have very high gain and are virtually superradiant. In consequence, laser action can be sustained with a fully-reflecting rear mirror and an output window whose reflectivity is only a few (e.g., four) percent.

With excimers, however, "sustained" means maintained for time periods on the order of excited-state lifetimes that are only—for XeCl as an example—ten nanoseconds. Although short pulse duration is desirable in many applications, such an extremely short duration also has drawbacks.

In particular, it creates an extreme requirement for properly timed and uniform electrical discharges, to produce and pump the desired upper states with adequate synchronism and uniformity throughout the laser chamber. Otherwise the resulting laser pulses are relatively very weak.

Accordingly, various strategies are used in attempts to provide a relatively uniform preionization discharge in the laser cavity, before the main discharge starts. Generally if the preionization is relatively uniform then the main discharge will also be relatively uniform.

Thus excimer lasers require relatively expensive power supplies and pulse-forming networks. Electrodes and basic cavity designs too are in general much more expensive than in lasers of other types.

Prior excimer lasers may be considered in two separate categories: transversely discharged units and certain others that have appeared commercially; and longitudinally discharged devices, remaining almost entirely in the lab-research realm.

Commercial units—transversely discharged or microwave-excited: Until now, to take full advantage of the inherent advantages mentioned above, nearly all excimer systems available commercially have been very high-powered. Pulse energy varies from the high millijoules to more than a joule, and repetition rates extend into the kilohertz region; so that average power in some commercial units is in the kilowatts.

Almost all these lasers have been transversely avalanche-discharged. Operation of these devices is similar to that of earlier and more familiar carbon-dioxide "TEA" or transversely excited atmospheric-discharge lasers. Some early excimer lasers were constructed using converted TEA lasers.

These devices represent superb technological accomplishment and are extremely useful tools. They also, however, have certain important disadvantages.

They require very fast coupling of high electrical energy into the laser head, which makes it very critical to assure the long life of electrical components as well as that of the laser proper. This requirement generally leads both to expensive components and to sophisticated, costly protective circuitry.

These lasers have very large discharge volumes, which aggravate the above-mentioned difficulty of achieving uniform preionization and sufficient initial ion density for a uniform glow discharge. This difficulty too is reflected in the added costs of sometimes-exotic subsystems directed to effective preionization.

Poor beam quality (high beam divergence, irregular cross-section, and beam nonuniformity) calls for very expensive and complex optical delivery trains to refine it for use.

Relatively low spatial coherence (probably arising from imperfect synchronicity of lasing in different portions of the cavity) gives rise both to freedom from speckle and to high beam divergence. The former, however, usually is desirable, whereas high divergence is problematic.

Energy per pulse falls relatively quickly once a gas aliquot is placed in a system. This loss results from chemical reaction of the halogen gas with materials of construction of laser components that are exposed to the gas—progressively reducing halogen concentration available for excimer formation and lasing action, and furthermore creating impurities (both gaseous species and solid deposits on windows) that attenuate the laser radiation. These losses necessitate elaborate on-line equipment for gas circulation, purification and replenishment. Cost of the halogens themselves—and managing of gas supplies and exhausts—in many cases are significant.

As a result of these factors, most commercial excimer lasers are very large (and thus inconvenient and expensive to house), and very time consuming and costly in service and maintenance. Above all, they are extremely expensive to buy and to supply with the needed gases.

These costs are particularly troublesome because in many applications—for example, spectroscopy, detecting, and especially semiconductor integrated-circuit failure analysis—usage is typically only occasional or at most intermittent.

Thus a topic of very great importance for manufacturers, vendors and users of transverse-discharge excimer lasers is "gas lifetime". Gas lifetime is often taken as the number of output pulses that can be obtained before the energy per pulse falls to half of the original value. As will be seen shortly, this conventional focus on the number of pulses is drastically different from the thrust of our interest in gas lifetimes.

Various excimer species have correspondingly various gas lifetimes. Hence there is also an important focus upon the gas species chosen, as to the resulting lifetimes.

For example a recent technical note, *Laser FAX* No. 3 from Lumonics Ltd. (a British manufacturer of excimer lasers, and of sophisticated cryogenic processors for excimer-laser fill gas), includes this observation:

The XeCl transition at 308 nm is by far the most favourable in terms of gas lifetime. Typically, an excimer laser can be operated for 10 to 20 million shots on a single gas fill without any cryogenic gas processor, and the cost of a cryogenic processor is rarely justified for XeCl operation.

The Lumonics publication goes on to show the number of hours of operation for XeCl in a particular Lumonics unit, the Model "Excimer-600"—at 300 Hz with no cryogenic gas processor—as 4.6 to 22 hours. Although the technical note omits to say so, these operational hours must all occur on an essentially consecutive basis, because the gas-degradation rates of these high-powered devices proceed rapidly even when the devices are turned off. Thus the number of hours of operation may be viewed very nearly as calendar time.

The reasons for a high rate of halogen disappearance from commercial transverse-discharge excimer lasers—both in use and essentially on the shelf—arise intimately from the size and nature of the discharge chambers, and the character of the halogen gases preferred for excimer-laser operation. More specifically, chlorine and the other halogen gases are corrosive in the extreme, and react rapidly and even violently with most of the materials of construction of these large lasers.

Those materials include large surfaces of stainless steel, nickel, and polymers such as those known in commerce by their registered trademarks Teflon and Viton. All these materials are exposed not only to the reactive gases, but in almost all cases directly to the electrical discharges formed in these gases for creation and pumping of the necessary excimer species.

The elevated temperatures and ion densities of these discharges produce maximum interaction between the gases and the constructional materials. Furthermore, contamination and degradation of both the gases and the materials during discharge operation may possibly set the stage for still further chemical action later, while the lasers are turned off.

Some manufacturers have introduced protective coatings that purportedly are effective in resisting such reactions. Where these materials are exposed directly to the discharge volume, we consider their effectiveness limited. In any event, as will be seen, all such materials are far more vulnerable to reaction than the materials used in our system.

These reasons for swift deterioration of both the discharge chambers and the operating gases are known. Rather than dealing with them, however, it has become customary in the industry simply to treat them as if they were merely necessary concomitants of the process. Thus most literature in the field sweeps the problem under the rug by referring to "consumption" of the "fuel gases".

Of course it is perfectly well known that, with respect to the energy-pumping and -emitting processes of the laser itself, the gases are all but infinitely reusable; and that the gases are not "consumed," in the manner of "fuel," by the lasing process. Rather, as mentioned above, they are lost to chemical reactions that bind them, in useless chemical combinations, to the discharge-chamber walls and other components—and in both gaseous and solid species that attenuate the laser radiation. They can also be bound in other gaseous species that are inaccessible to the laser mechanisms.

Yet the industry has made little or no movement toward moderating this loss. The reasons for maintaining this expensive and wasteful operating mode are also clear.

First, the high power levels that are favored—to take fullest advantage of the high photon energy and other benefits of the excimer laser—require massive discharge chambers, high voltages and currents, and heavy-duty electrodes.

Thus chambers are typically a few tens of centimeters transversely, and roughly a meter long, with multiple feed-throughs and sturdy internal structures. Electrodes for forming primary transverse discharges are typically continuous solid metal bars mounted to the interior wall, and running the length of the chamber interior, along opposing walls—for example, top and bottom.

Further, some units also have preionization electrodes at opposing sides, sometimes in the form of a row of spark gaps, electrically in series. In other devices instead the main-discharge electrodes are of mesh, with the preionization electrodes behind them.

Now, all such industrial-size apparatuses necessarily entail use of typical industrial materials—steel, plastic, and the like. More-fragile materials usually associated with small laboratory instrumentation, though known to be preferable in terms of chemical inertness, would be impossible or very difficult to use in fabricating such large chambers that must be shipped and installed on a fairly routine basis.

Moreover, even the relatively inert materials such as glass would be difficult to fully clean and render passive in such large industrial forms.

Thus skilled workers in the industrial field of transversely excited excimer lasers think in terms of "gas lifetimes" of days, or at the very most weeks. They also think in terms of continuous, or at least frequent, gas supply to such lasers—with on-line tanks never more than a valve away, and with elaborate, expensive traps and other reprocessing equipment.

As can be seen, this branch of the excimer-laser field spares little in terms of material or money. It applies almost a brute-force approach to attainment of extremely high-energy, high-power laser pulses—for those applications that cannot do with less.

One exception to some of these statements is the product line of Potomac Photonics, Inc. (PPI), of Lanham, Md. That firm offers very compact devices, excited by microwave radiation without electrodes.

Absence of electrodes from the cavity interior makes possible a great reduction in mutual contamination between the laser gases and the materials of construction. In principle this should greatly extend gas lifetimes.

Unfortunately, however, the PPI systems retain many of the adverse characteristics of the large, transverse-discharge systems that have electrodes. First, the system employs a trickle-through gas system, with a pressurized "premix cylinder", a regulator and an exhaust port. In addition the system has a so-called "optional" halogen trap.

Second, gas and component lifetimes are reported in terms of pulses and "continuous operating hours". More specifically, recent PPI literature on these commercial devices asserts:

"[G] as consumption for the 260 hour test averaged about 35 cents per hour. Test data suggested that discharge tube replacement was desirable after about 300 hours of 2 kHz operation. . . . A new tube with mount can be purchased for $1380, or PPI can replace only the tube at a cost of $590."

The noted 300 hours of continuous operation corresponds, of course, to less than two weeks; and the $1380 or $590 replacement cost amounts to an added $4.60 or $1.97 per hour, respectively, beyond the 35 cent-per-hour direct cost of gases. Furthermore there is no indication of the probable lifetime of the tube under the more-interesting assumption of intermittent or occasional use.

Perhaps the lowest-priced excimer lasers on the market, the PPI systems are significant developments. Their distinct operating inconveniences and apparently frequent replacement requirement, however, do leave much to be desired.

Longitudinally-discharged research units: During about the last thirteen years some work has been done on longitudinally discharged excimer lasers. Generally speaking, the advantages of this type of excimer laser are (1) simplicity of the discharge-assembly structure, (2) compactness—i.e., much smaller size than the transverse systems, (3) circular beams with low divergence, and (4) theoretically greater amenability to establishment of a uniform glow discharge, because of smaller resonant volume and relatively lower pressure.

On the other hand, longitudinal systems heretofore have been bypassed commercially because of their much lower energy output. Virtually none of the known systems has moved beyond the basic-research stage.

None of the research reports which we have studied includes consideration of laser lifetime, reproducible or consistent pulse energy, or particularly the quality or effectiveness of preionization. Following is a review of research papers in this area.

In this review we shall emphasize two main questions that relate to our invention: (1) What overall general suggestion do the workers in this field offer as to improvement of apparatus lifetime? (2) What did they understand and teach as to preionization?

An early report is due to Isakov et al., in "Excitation of a XeF laser with a longitudinal electrical discharge," *Soviet Tech. Phys. Letters* 3 (September 1977), at 397–98. Isakov recounts obtaining 0.8 kW/cm$^3$ maximum excimertransition power in a pulse that appears to have been about twenty-five nanoseconds long.

Based upon these figures, his output-pulse energy density was apparently some twenty microjoules per cubic centimeter of the discharge tube. Isakov reports using capillaries thirty centimeters long and one to four millimeters in diameter; thus if his energy-density figures apply throughout the capillary size range, his pulse energy must have varied from about 23 to about 380 microjoules.

The last-mentioned figure at first seems quite respectable, considering the apparatus involved. Although using a power supply capable of 500 Hz, however, Isakov was not able to obtain more than one "shot" (pulse) of excimer radiation without replenishing the gas in his device; and even with a continuous-flow system could not turn over the gas fast enough to operate his system beyond 10 Hz.

Isakov was probably correct in attributing the one-shot character of his apparatus to "rapid loss of the NF$_2$ radical formed in the discharge due to an interaction with the chamber material." He said nothing, however, about pulse-power reproducibility, and expressed no appreciation for the possible application of preionization techniques.

Isakov did not suggest how any of his results might be used to guide development of the excimer laser into a practical tool for routine purposes. Plainly his device was not intended as anything other than a research unit.

Isakov was followed by Burkhard et al., in a technical paper entitled "XeF excimer laser pumped in a longitudinal low-pressure discharge," *Appl. Phys. Lett.* 39 (Jul. 1, 1981), 19–20. These workers at the Institute of Applied Physics in Bern were able to operate their device with a "stable output" at one hertz for more than a half hour, and obtained a circular (apparently as distinguished from annular) beam.

They were also sophisticated enough to provide a "HF prepulse"—presumably meaning a high-frequency preionization pulse, applied to the same longitudinally arranged electrodes as the main discharge excitation. The cost of these advances, however, was apparently severe in terms of output pulse energy: the reported mean for optimum gas conditions was only 0.6 microjoule.

Burkhard noted that a "significant decrease in the output was observed during the first pulses of a new gas filling". From this observation he drew the conclusion that "an enhancement of laser efficiency should be possible with a gas flow system."

Thus the first and major teaching of a pioneering worker in regard to gas lifetime of longitudinal excimer discharges seems to have been an explicit suggestion to follow the lead of the transversely excited systems. Accepting that solution would start this field upward on the same complexity-and-cost spiral toward progressively more elaborate systems.

Burkhard also suggests that a desirable direction for further attention might be to increase the full beam angle of his apparatus "by using a resonator with discrimination of higher-order transversal modes."

Closely following Burhard, in turn, is a research paper of Cleschinsky et al., "XeF-Laser with Longitudinal Discharge Excitation," *Optics Communications* 39 Sep. 15, 1981), 79–82. The apparatus used in that work included a complete gas-handling system, including a cold trap, pump, pressure-control system, and isolation valve.

In addition, the discharge system isolated by that valve includes a reservoir "to increase the operating period of a gas filling." The reservoir is in a tubulation loop with the discharge cavity; and a diaphragm pump is also installed in this same loop to circulate the gas through the loop and thus through the discharge chamber.

The Cleschinsky system was "operated without preionization". This comment reveals, of course, that Cleschinsky was aware of the use of preionization techniques, but presumably considered them inappropriate for his purposes.

Encircling Cleschinsky's discharge tube was a foil wrapping, connected to his ground electrode; this foil wrapping apparently was not used in any way which Cleschinsky considered preionization. Rather, he viewed it simply a part of his longitudinal main-discharge system, and in his words it was included "to improve the reproducibility of the discharge".

In his report, Cleschinsky describes attainment of 300-microjoule output pulses, and a gas lifetime of a thousand pulses per filling—or 300,000 for the system if the gas is replenished. Hence the teaching of these leading workers, once again, is to follow the lead of the transversely excited systems in rating or valuing performance in terms of the number of pulses.

Cleschinksy and his colleagues in the Optical Institute at the Technical University of Berlin have since reported on closely related experiments—apparently with substantially the same apparatus—in Eichler et al., "KrF laser with longitudinal discharge excitation" *Appl. Phys. Lett*, 46 (May 15, 1985), 911–13; and again more recently in de la Rosa et al., "ArF laser excited in a capacitively coupled discharge tube", *J. Appl. Phys.* 64 (Aug. 1, 1988), 1598–99.

Eichler, emulating his colleague Cleschnisky, used a grounded capacitive foil-wrap cathode, and said it was to "improve the reproducibility of the laser discharge." He also "found [it] to increase the output power."

De la Rosa, however, used no internal cathode and hence no glow discharge. Instead the discharge was struck to a capacitively coupled foil only, and was exclusively corona.

The Eichler paper, addressing krypton-fluoride operation, reports pulse energy of only fifty microjoules at two hertz; while the de la Rosa installment, in relation to argon fluoride, describes pulse power even lower—fifteen microjoules, but at ten hertz. Neither reports any gas-lifetime data.

Although this series of papers progresses nearly to the time of the present writing, none of the reports expresses any interest in preionization or proposes that such techniques might have any value for practical devices or otherwise. To the contrary, Cleschinsky's original paper concludes "further improvement seems possible by optimizing the driving circuit."

Similarly, Eichler proposes, "Further improvement should be possible using higher excitation voltages"; while de la Rosa predicts, "Energies up to 100 $\mu$J should be possible using low-loss mirrors." It will be understood that during the course of this series of reports from Berlin, preionization meanwhile in the transverse-excitation branch of this field has achieved substantially general acceptance.

Following the initial report of Cleschinsky from Berlin, one of the present inventors reported from the Shanghai Institute of Laser Technology. The paper is Zhou et al., "XeCl excimer laser excited by longitudinal discharge", *Appl. Phys. Lett.* 43 (Aug. 15, 1983), 347–49. In the related work, no reservoir was used.

The paper reports maximum pulse energy of 317 microjoules in a glass capillary, but no average-power or gas-lifetime data. That value of energy, moreover, was not obtained frequently; in fact, the stability or reproducibility of pulse energy from shot to shot was far below the quality that would be expected of a commercial system.

Further, the apparatus was not operated continuously at all, but only on the basis of one and two shots at a time. The total number of shots over the entire project was about 10,000—after which the pulse energy was generally at about seventy percent of the original level. During these experiments, gas was replenished two to three times a week, through a valve which remained in line between the laser and the gas-handling system.

The report from the Shanghai Institute was the first to describe essentially d. c. preionization in a longitudinal-main-discharge system. Preionization was provided by a corona discharge through the capillary wall, between a foil wrapping and the anode.

Thus the preionization geometry was essentially longitudinal—from the anode to a point along the tube at which the external foil wrapping was effectively coupled capacitively. This latter point initially was adjacent the end of the foil wrapping closest to the anode, but later shifted progressively along the interior of the foil—so that the preionization discharge itself propagated lengthwise to nearly the full length of the tube.

In disagreement with the proposals of the Bern and Berlin groups—to seek improvement through use of a gas-flow system or "discrimination of higher-order transversal modes" (Burkhard), a refined "driving circuit" (Cleschinsky), higher voltage (Eichler), or "low-loss mirrors" (de la Rosa)—the Shanghai researchers' paper proposes that solutions lie in the direction of "preionization to improve the discharge uniformity" and in matching the impedance of the transmission line from the driving circuit to that of the laser.

The Eichler 1984 and de la Rosa 1988 analyses follow the appearance of Zhou's 1983 report from Shanghai. Thus the latter was not accorded general acceptance, by those skilled in the art, as definitive of the problem or its solutions. Rather, the analysis of Zhou has simply remained one in a group of broadly divergent teachings.

Careful comparison of the first two Berlin papers with Zhou's article, however, reveals surprisingly that experimental arrangements were very similar. In fact both Cleschinsky and Eichler employed the same grounded-foil-wrap system which gave Zhou "preionization".

Evidently the Berlin group, while studying, analyzing and describing the laser output in detail, did not appreciate the physical significance of the capacitively coupled foil in preionization terms. Thus they could not fully recognize either why it aided output energy and reproducibility, or how it might be improved.

Cleschinsky, in fact, insisted that his device operated without preionization; but his colleague Eichler, apparently carrying on the same work, observed some phenomena that he "explained assuming that the discharge develops in two stages. First a discharge loads the capacitance consisting of the inner tube wall and the aluminium foil, then after a certain length of time, depending on the discharge parameters, breakdown between the internal electrodes takes place."

It is at least plausible to speculate from this that a longitudinally propagating corona provided preionization in the hardware used by Eichler (and Cleschinksy) too. Although Zhou was able to see preionization as a valuable function, at the time he overlooked the limitations of the longitudinally propagating preionization system that he was using.

Meanwhile Dutch researchers were working with a longitudinal tube that was capacitively coupled from end-plug anodes to a foil-wrap central cathode. It is described in Gerber, "A KrF-Laser Excited by a Capacitively Coupled Longitudinal Discharge," *Optics Communications* 53 (Apr. 15, 1985), 401-04.

Gerber describes a longitudinally propagating discharge that appeared in his tube. That discharge apparently was very similar to the longitudinally propagating preionization corona in the Zhou paper (and possibly the two Berlin papers) just discussed. Although Gerber attained pulse energy of 900 microjoules, his beam was ring-shaped or annular, and he reported no data for average power, repetition rate or life.

At first Gerber operated his apparatus with the cathode capacitively coupled (like de la Rosa's). Later, however, Gerber converted one of the end-plug anodes to a cathode by connecting it to the foil cathode.

When operating this modified system at pressures below one bar, he obtained a directly coupled longitudinal discharge between the two end-plug anodes—thereby creating a system very much like those of Cleschinsky, Eichler and Zhou. Nevertheless Gerber achieved no increase in output energy, pulse duration, or even uniformity of the beam cross-section, which remained annular.

Although he was able to use his capacitive discharge as a preionization pulse for a direct longitudinal main discharge, Gerber—like the three researchers using similar systems before him—failed to discern what it was about his system that precluded fully acceptable main-discharge properties.

He concluded instead that "this discharge mode is not suited to . . . KrF molecules." Gerber's only suggestion for improvement of the apparatus is that "still higher pulse energies could be obtained by a further increase of the applied voltage."

In the next year (still before the paper of de la Rosa), Furuhashi et al. reported from Nagoya, Japan, on yet another divergent approach. Furuhashi's group used preionization by spark-generated ultraviolet light.

The discharge tube in this work consisted of Teflon tube segments, four millimeters in diameter, interconnected by nylon or Teflon fittings. Spaced at six-centimeter intervals along this structure, Furuhashi installed five pairs of stainless-steel electrodes, each pair forming a four-millimeter spark gap.

In the resulting report, "Longitudinal discharge XeCl excimer laser with automatic UV preionization," Appl. Phys. Lett. 50 (Apr. 6, 1987), 883-85, Furuhashi conceded that his "laser output energy is not very large, around 100 $\mu$J, and also the efficiency is not very high". Perhaps even more significant is the absence of data on repetition rates, and the observation that the number of shots obtained without gas replenishment was only "over 1000".

Furuhashi's proposed cures, however, went off in yet other directions, different from those of the other skilled workers in this area. He proposed to improve performance by optimizing "various parameters such as the mirror reflectance, the tube diameter, and the length of segments . . . and using a gas flow system" (emphasis added).

In this last-mentioned regard, Furuhashi joined Burkhard in teaching that a primary requirement for advance in longitudinal-discharge excimers must be a gas-flow system. Thus for Furuhashi and Burkhard a primary thrust of this field should be to follow the lead of the big transverse-discharge systems.

Overview of the prior art: Transversely discharged high-power excimer systems have been commercially successful but are large, require special installations to accommodate halogen-gas management, and are extremely expensive in both acquisition and maintenance. Their power output is far higher than needed by many users.

Some of the lab-research papers discussed above have mentioned the idea of adapting the longitudinal excimer laser for use in a group of low-power applications. Gerber and Zhou, for example, referred to "miniature systems [for] e.g. spectroscopy and testing" or "pumping of dye lasers and the first step pumping in amplifying the transversely excited excimer lasers, etc."

From their technical writings at the same time, however, it is clear that these comments were only made as abstractions and that none of the researchers knew how to go about actually making such systems. As will be seen in a later part of the present document, at least one of those early experimentalists was far from any practical development.

Hence there has been heretofore no practical connection between the very large, high-powered transversely discharged devices and the longitudinally discharged experimental units. The only suggestions from researchers for improvement of the latter have been very helter-skelter. As recounted above, they range from driving-circuit refinements, or "mode control", to greater use of gas-flow systems.

This last-mentioned one of the disparate proposed directions—namely incorporating a gas-flow system—is closely related to one of the two topics mentioned earlier as being of main concern in this document: gas lifetime. The approach of using gas-flow systems is noticeably more popular than others.

This approach is apparently also endorsed by the designers at PPI. The Potomac Photonics instrument, being microwave excited, is not readily characterized as discharged either transversely or longitudinally. The designers of that device are virtually the only writers to propose that a practical excimer discharge tube should and could be made of material minimally reactive with halogen gas.

Even those writers, however, have moved in the direction of the flow-through gas system. PPI's approach accordingly is to evaluate gas lifetimes in terms of pulses or operating hours, rather than shelf time.

In adopting that solution as the principal thrust for exploiting longitudinal-discharge excimer lasers, the longitudinal-discharge field would follow the developmental course of the transverse-discharge systems—whose drawbacks we have already pointed out. This predilection of the researchers for such a system is understandable in context.

First, all known commercial systems employ elaborate gas-handling systems, most using some form of gas-flow system. Secondly, all the researchers themselves very apparently worked with gas-handling systems either continuously attached or at the ready—that is, just at the other side of a valve from the discharge system.

In a research context such facilities are not particularly extraordinary or troublesome. Researchers' preference for flow systems is therefore understandable.

The gas-flow operational mode, however, is very undesirable for exportation into the industrial context. There, personnel may not be as consistently well informed, careful and patient in the management and handling of highly reactive gases; and the pressing importance of laboratory-throughput or production achievements may be more dominant.

Consequently management of corrosive gas supplies—and proper exhaust of waste gases—in many facilities can pose not only an inconvenience but also significant problems of safety. This is particularly true when a laser is used only occasionally, affording inadequate opportunity to develop proper procedures into good habits.

The use of systems with short shelf life also places a nearly impossible burden on facilities managers to plan ahead for use. In many cases—such as, for example, integrated-circuit failure analysis—demand for use is unpredictable.

Even if an apparatus does happen to be ready for use in terms of its shelf life, considerable preparation is needed for beginning operation of the laser. In terms of the desired use, such preparation represents lost time.

Gas flushing may be required. Manipulation, adjustment and stabilization of gas parameters may be touchy. The cost of the gas itself, both in these preliminaries and in laser operation, can be significant.

Furthermore, using a flow-through laser system with accompanying gas-supply and gas-handling equipment tends to militate in favor of giving the laser system itself the status of a facility. That is, it has its own stationary plumbing and other installation requirements.

Application apparatus to be used with such a system must accordingly be moved to the facility site of the laser. This can be a significant drawback, for often it is preferable to disturb the application apparatus as little as possible—by taking the laser to the application.

Turning now to the topic of preionization, none of the researchers specifically pinpointed it as an area importantly needing refinement. In all the reports discussed here, preionization is either ignored or employed in a clearly ineffectual way—at least by the standards of commercial-quality instrumentation.

In the experimentalists' papers discussed here, at least taken as a whole, no clear theory is stated for the importance of preionization, especially in longitudinal lasers. There is surely no plain statement in these works of (1) what constitutes good preionization or (2) how to go about achieving it.

This comment is true even through it may be remarkable in view of the familarity of preionization in transverse systems. The longitudinally propagating preionization pulse apparently employed—with varying degrees of awareness—by Cleschinsky, Eichler, Zhou and Gerber, is subject to deficiencies that can be plainly articulated. The same is true of the spark-ultraviolet system of Furuhashi.

Specific identification of the preionization deficiencies in these systems, and of a proper course for effective preionization, is part of the making of the present invention. Accordingly it will be presented in a later section of this document.

SUMMARY OF THE DISCLOSURE

Our invention is an excimer-laser system. In a first broad aspect or form, our invention is exclusively for a particular group of uses or applications which for the sake of simplicity we shall call "low-average-power applications"—although, as will be seen shortly, the selected group of uses has other extremely important characteristics.

By "low average power", for purposes of this document—and particularly the appended claims—we mean power on the order of five to ten milliwatts or less, if the system includes no gas-recirculating pump; and on the order of twenty milliwatts or less if the system includes such a pump. Our reason for making this distinction will be made more clear in the following discussion.

The applications of interest include integrated-circuit failure analysis, spectroscopy, sensing, diagnostics and laser-amplifier first stages. We do not mean, however, to limit our system to use in these enumerated fields.

In its first broad aspect or form now under discussion, our invention includes a gas enclosure. That enclosure in turn includes a discharge tube, and a gas reservoir that is in communication with the tube.

Throughout this document including the claims, except where otherwise indicated by the context, we use the term "communication" to refer to interconnection of the interiors of two or more chambers by at least one gas pathway, permitting flow of gas between the interiors of the chambers. Thus for example by "gas reservoir . . . in communication with the tube" we mean a gas reservoir whose interior is interconnected with that of the tube by at least one gas pathway, permitting flow of gas between the interiors of the reservoir and tube.

The gas enclosure of this first form, however, has no communication with any gas exhaust or with any gas pump. (That is to say, in other words, the enclosure communicates with neither an exhaust nor a pump.) Moreover the enclosure has no communication with any valve that leads to a gas exhaust or pump, or to ambient. Hence for purposes of this form our above-defined phrase "low average power" shall be understood to mean on the order of five to ten milliwatts or less.

In this first broad form or aspect, our invention also includes gases for forming an excimer when excited. These gases are sealed within the enclosure.

In addition this form of our invention must include some means for exciting the gases in the tube to form an excimer that lases. For purposes of breadth and generality in the description of our invention, we shall refer to these means simply as the "gas-exciting means" or the "exciting means".

This first broad form of our invention also includes some means for extracting radiation from the tube. Again for breadth and generality of expression we shall call these simply the "radiation-extracting means" or "extracting means". These means extract from the tube exclusively low-average-power radiation, for use exclusively in low-average-power applications such as those mentioned by way of example above.

Furthermore this first form has a long useful life, without replenishment of the gases. That life is at least one year after the gases are sealed within the enclosure—at least in intermittent use at average power less than four milliwatts.

By "intermittent use" we mean duty cycles that are, as a practical matter, characteristic of the low-averagepower applications for which our system is intended. Such duty cycles may typically range from less than a hundred shots a day, in integrated-circuit failure analysis, to a total of perhaps one hour's continuous operation per day in spectroscopic or sensing applications—making due allowance for sample-changing time, etc.

By "useful life" we mean essentially the life of the laser system in intermittent use, as defined above—provided that the system is operated at suitable average power levels for the intended applications. Such power levels are three to five milliwatts or less with no recirculating pump; or twenty milliwatts or less with a pump.

Consequently for the first broad aspect of our invention here under discussion, in which there is no pump, the "useful life" is the system life in intermittent use at average power levels of three to five milliwatts or less. (Merely for definiteness in stating the system life, we sometimes simplify the three-to-five-milliwatt rating to four milliwatts.)

We believe, however, that the useful life is affected only to a relatively small degree—if at all—by intermittent use at these suitable or rated average-power levels. In other words, we consider the life of the system in intermittent use at rated power to be at least very close to the system shelf life. Thus the "useful life" can be regarded as a sort of shelf life that may be enjoyed even in use.

In fact the useful life in most cases is affected only very little, at most, even by continuous use—at one to three milliwatts or less with no pump, or perhaps ten with a pump. In the appended claims we therefore refer to the "useful life . . . at least in intermittent use" (emphasis added).

We do not wish to be held to any particular way of quantifying the level of residual performance that demarcates the end of the system's "useful life". There exists no single endpoint that would make physical good sense in all situations of interest.

Various reasonable ways, however, will be understood by those skilled in this field. These include use of the points at which pulse energy falls below (1) half of its initial value, or (2) a pragmatically usable value for the particular application at hand, or (3) some arbitrarily chosen value characteristic of our apparatus, which might for example be in the range of one hundred to two hundred microjoules.

The foregoing, including the stated definitions, may represent a definition of the first aspect or form of our invention in the broadest or most general terms. Even without proceeding further, it can be seen that this form or aspect of our invention runs distinctly counter to the teachings of all prior excimer laser systems discussed, and resolves many of the problems seen in the prior art.

In particular, by sealing the gases within the enclosure and by providing an enclosure that does not communicate with a pump or exhaust, we depart abruptly from all of the known commercial devices. In this regard, all of the prior transverse-excitation lasers have elaborate gas-handling systems, most of which have both a pump and an exhaust port. The PPI microwave trickle-through system uses a gas supply tank and an exhaust.

At the same time we part company from all of those longitudinal-system researchers who have expressed any view in this area, since they suggested use of gas-flow systems. While the references to a gas-flow system are somewhat ambiguous, such a system must use either a recirculating scheme (and hence some form of pump) or a waste-gas approach that requires an exhaust port.

Furthermore by providing a system with useful life of one year without gas replenishment, we take leave dramatically of all prior excimer systems. The useful life of all prior systems, as already noted, is in the range of weeks or—more commonly—days, and in many cases even hours.

This first form resolves many problems of the prior art:

(1) Once acquired, our invention can be kept ready and immediately available at hand for long periods such as weeks or even months, in anticipation of intermittent or even occasional use as required.

Such a usage pattern is characteristic of many important low-average-power applications, particularly failure analysis.

(2) When needed, the apparatus can be readily placed in operation on short notice, without the major inconveniences and hazards of managing tanks of compressed halogen gas—or safely disposing of the waste gas.

In addition, neither gas flushing nor manipulation, adjustment or stabilization of gas parameters is required before beginning use of the system. Of course the cost of gas as such is negligible.

(3) The apparatus is stored in a small space—occupying just part of an ordinary laboratory cart if desired—and is easily moved to a desired operating site without trailing an umbilicus to a gas-handling system.

(4) The cost of the instrument is far lower than any of the transversely excited, high-power devices.

Thus, as we see it, significant portions of our inventive contribution to advancing the excimer-laser art have included recognizing or appreciating a need for a new kind of excimer laser. The need itself actually has existed and has been felt for many years, though perhaps it has not been effectively articulated.

We believe we are the first to appreciate that isolation of certain segments of the excimer-laser market for special, separate treatment could be economic. In particular, we refer to those users of excimer lasers for whom:

laser usage is intermittent at most, so that shelf life is at least as important as operating time or number of pulses;

connections to a gas-handling system, and managing tanks of gas and the like, are significant inconveniences; and high average power is not required.

These characteristics apply to users across a broad spectrum of industrial usages. For simplicity of the appended claims, we have identified them in terms of the third characteristic—a low demand for average output power.

It is ironic that many such users have acquired monumental transverse systems capable of delivering average power from four to six orders of magnitude greater than needed, for applications generally requiring pulse energy well below one millijoule and repetition rates on the order of one hertz.

The gas enclosure in this first broad form or aspect of our invention will not communicate—in most or perhaps all instances—with any gas supply. The enclosure also will not communicate, in many cases, with any valve. The foregoing definition of this first broad form, however, makes no mention of a gas supply; and actually expressly permits inclusion of a valve in the system—provided that the valve does not lead to a pump or exhaust, or to ambient.

In defining this first form, we have for the following reasons avoided expressly excluding such elements. First, it is perhaps possible that some sort of "gas supply" might be provided within our sealed system.

Such a component might, for example, take the form of a chemical reservoir—e.g., a getter, heatable to release halogen gases in a controlled fashion. Possibly such a supply could be included in our system without adverse effect—and possibly even with significant favorable effect.

Moreover, the concept of a gas supply might be taken to encompass a passive reservoir, and for reasons to be discussed later we do include a gas reservoir in this aspect or form of our invention. In any event, we have couched our above definition to clearly encompass an excimer-laser system that has such a supply apparatus.

Second, a valve is not necessarily harmful in our system, provided that it does not lead to a gas-handling system element such as an exhaust or pump, or to ambient. Hence we do not wish to have the appended claims defeated by mere inclusion of a "blind" valve.

In fact there are distinct benefits to sealing off a blind valve at a suitable point in our system. This topic will be taken up shortly.

Before discussing some additional preferred features of this first broad aspect or form of our invention, we shall introduce a second broad aspect or form. This second aspect or form is complementary to the first.

The first and second forms or aspects differ in two ways:

(1) in the first form, but not the second, the presence of a gas pump (or a valve leading to a pump) is expressly excluded; thus the second form may include a pump (or a valve that leads to a pump); and (2) in the second form, the enclosure expressly must be sealed off by a substantially permanent type of seal, whereby it can be reliably handled and transported without compromising its useful life.

In the second broad form of our invention, a pump can be used to recirculate gases between the discharge tube and the reservoir. Such circulation depresses the temperature of both the hardware and the gases.

Even in the absence of a pump, this effect occurs to a small extent by convection between a reservoir and the discharge tube; a recirculating pump enhances the effect. In consequence the average power of the system can be raised—by a factor which we estimate as within the range of two to ten—without significantly, if at all, shortening the system life.

Within the overall conceptual framework outlined above, such a power increase can be useful for a few specific applications that happen to fall in the relatively narrow extended average-power range. Contrary to the suggestion of some of the above-discussed references, however, we believe that this increase should not be seen as a central theme.

This second broad form remains, however, sealed off and ready for use, so that essentially all of the advantages previously mentioned for the first board form are applicable here too. This second form is also clearly distinct from all of the known prior art by being sealed off by a substantially permanent type of seal—which essentially ensures that the integrity of the gas fill has not been violated.

The foregoing may serve as a definition of the second aspect or form of our invention, in broadest or most general terms. As will be understood, however, we prefer to practice our invention with certain additional features or characteristics, for maximum enjoyment of its benefits.

For example, we prefer to make the apparatus of our invention so that it serves as both the first and second forms or aspects defined above. As written, these definitions are not mutually exclusive: a laser system that has no pump and is sealed off by a substantially permanent seal answers to both definitions.

Further, we prefer to include in our invention some means for supporting a target that is effectively susceptible to low-average-power laser radiation. We also prefer to include some means for directing and applying the extracted laser radiation to that target.

For example, for integrated-circuit failure analysis we include some means for supporting an integrated circuit to receive the radiation, and some means for directing and applying the extracted laser radiation to a component or pathway of the circuit. That component or pathway is disabled or exposed by the low-average-power radiation.

In such a system the circuit is subjected to failure analysis by evaluation before and after the component or pathway is disabled or exposed. Accordingly we prefer to also include electrical circuitry operatively interconnected with the circuit, for testing the performance of the circuit—so that the evaluation can include testing immediately before and after the component or pathway is disabled or exposed.

As another example, for spectroscopic analysis, sensing, diagnostics and so forth we prefer to include in our laser system some means for supporting a specimen having a characteristic that is to be determine—and which interacts with laser radiation to produce a signal related to that unknown characteristic. We also prefer to include in this system some means for directing and applying the extracted radiation to the specimen, and some means for monitoring the signal to determine the characteristic of interest.

The signal may be, for example, electromagnetic radiation from the specimen, such as fluorescence—or such as a beam of the laser radiation that has been selectively attenuated, as in absorption or reflection, by the specimen. In such cases the monitoring means may comprise an optical or like sensor that responds to the signal and develops an electrical signal that carries information related to the specimen characteristic to be determined. The monitoring means also preferably include some means for processing the signal and displaying the information.

We also prefer to make the gas enclosure of our invention substantially all of materials selected exclusively from the group consisting of glass, silica and ceramic. The length of the useful life of the system is enhanced by this selection.

Exposed within or extending into that enclosure, some relatively small components made of other materials are allowed and in fact needed. For instance, such components include electrodes, fittings, valves and seals.

To further enhance the system life, we prefer that those relatively small components be substantially all of materials selected exclusively from the group consisting of (1) tungsten and tantalum, and like metals such as those nearby in the periodic table of the elements; plus (2) the materials known commercially by the registered trademarks Teflon and Viton, or the equivalents; plus (3) low-vapor-pressure resin.

As is well known to those skilled in this field, the generic materials distributed as "Teflon" and "Viton" are polytetrafluoroethylene and a fluorocarbon, respectively.

We also prefer that all of those components that are in fact made of Teflon, Viton or the equivalent be in portions of the enclosure relatively remote from the excited gases; and that the materials of the enclosure—and of all components exposed within or extending into the enclosure—substantially exclude nickel and stainless steel. All these selections too enhance the length of the useful life of the system.

Further, we prefer that any valve that is exposed within or extending into the enclosure be sealed off by a substantially permanent type of seal—such as that recited above in defining the second broad form of our invention—against communication with ambient or with any gas pump or exhaust.

We also prefer that the reservoir in our invention be much larger in volume than the discharge tube—preferably at least several hundred times larger, and ideally on the order of a thousand times larger. In our device, despite various techniques employed to deter gas loss to the walls and internal components, some residual loss does occur; and the reservoir tends to dilute the effect of this loss.

Smaller reservoirs do not provide as effective a mitigation of this residual effect. Larger reservoirs, on the other hand, operate against the principle of diminishing returns: they are themselves progressively more difficult to clean and outgas, and progressively more bulky and fragile, out of proportion to the added benefits conferred.

Two other broad aspects or forms of our invention will now be introduced. Although we prefer to practice our invention by incorporating these additional forms or aspects into a single apparatus with each other—and in fact a single apparatus that also constitutes the first two broad forms discussed above—many advantages of our invention can be enjoyed by practicing either the third or fourth form alone.

In its third broad aspect, our invention is an excimer-laser system. It includes a discharge tube and, within the tube, gases for forming an excimer when excited. This broad aspect also includes some means for preionizing the gases—with substantially uniform ion density along the tube.

In this third broad aspect or form, our invention also includes some means for establishing a longitudinal electrical discharge in the preionized gases, substantially throughout the tube. These "main-discharge means" form from the preionized gases an excimer that lases.

This broad form additionally includes some means for extracting laser radiation from the tube. The foregoing may serve as a definition of the third broad aspect or form of our invention, in the most general or broad terms.

Before discussing some advantageous variations of that third form, we shall introduce the fourth broad aspect or form of our invention. This too is an excimer-laser system.

It includes a discharge tube and, within the tube interior, gases for forming an excimer when excited. It also includes preionization electrodes for establishing a transverse electrical discharge in the tube—to preionize the gases.

The preionization electrodes are exclusively outside the tube interior—that is to say, either outside the tube entirely or at least embedded in the tube wall—and are generally at opposite sides of the tube along substantially the entire length of the tube. They are capacitively coupled to the gases through at least part of the tube wall—in fact, through the entire thickness of the tube wall, unless they are embedded in the wall.

This fourth form also includes a source of high electrical voltage operatively interconnected with the preionization electrodes. In this fourth broad aspect or form, our invention further includes some means for establishing a longitudinal electrical discharge in the preionized gases; these "main-discharge means" form from those gases an excimer that lases.

In this fourth aspect, our invention also includes some means for extracting laser radiation from the tube. The foregoing may constitute a definition of the fourth form in most general or broad terms, but we prefer in practicing the invention to incorporate certain other characteristics or features.

In particular, we believe that the fourth form or aspect just described may, if optimally configured and operated, be used to produce preionization with substantially uniform ion density along the tube—as earlier recited in relation to the third broad form. Hence we prefer to practice the invention in both of these broad aspects together.

As will be appreciated, however, within the third form other means of providing substantially uniform ion density may be substituted. On the other hand, the fourth form as described may be successfully operated, conferring much of its desired benefit, even if it is not operated in such a way that the resulting ion density is substantially uniform. In particular, the desired benefits can be obtained without proving that the preionization ion density in a particular apparatus is substantially uniform.

We prefer to provide the preionization electrodes in the form of thin metallic coatings on the tube. We also prefer that the electrodes on opposite sides of the tube be insulated from each other by a pair of relatively thick dielectric baffles that are secured directly (as, for example, by adhesive) to the tube.

In regard to the third and fourth broad forms or aspects of our invention, we believe that an important part of our invention consists of recognizing what was wrong with the earlier longitudinal systems—in other words, what it was that prevented their attainment of high pulse energy consistently.

More specifically, we believe that the researchers in this area overlooked the necessity for providing a preliminary ion density that is both (1) substantially uniform and (2) adequately synchronous. Both substantial uniformity and synchronism must be provided along the entire length of the discharge tube.

In the case of Furuhashi's apparatus, discussed earlier, it is intuitively easy to see that the small spark gaps spaced at six-centimeter intervals along his tube probably produced a strongly varying ion density along the tube. The resulting main discharge was probably limited to generally the ion density found at the sparsely ionized points midway between adjacent spark gaps.

As to the systems that used a preionization corona discharge capacitively coupled through the tube wall, it appears that the corona propagated along the tube before striking of the main discharge. As it propagated, the corona would progressively "load" or saturate the capacitance of each successive segment of the tube wall, thereby removing the current and the voltage change necessary to maintain ionization.

Consequently the ion population along each tube segment would begin to recombine shortly after formation. By the time the corona reached the far end of the tube, the ionization in the near end could be largely dissipated by the recombination.

Although the maximum ionization in each segment of the tube may well have been uniform, that maximum value was never attained at the same moment in any two segments. In other words, the ion densities at various points along the tube did not peak simultaneously.

Hence as an inherent defect of such a preionization strategy, it was a physical impossibility to find any moment at which ion density was uniform along the tube. Various other phenomena might intercede from time to time, on an erratic or statistical basis, to provide coincidentally favorable ion uniformity—thus accounting for the relatively high pulses occasionally observed.

These observations suggest that mechanisms must be employed that inherently provide substantially uniform ion density, or in other words that ionize the entire cavity volume rather homogeneously and in good synchronism. With this insight, it is easy to see that the preionization structure of our invention in its fourth broad form or aspect is intrinsically far better adapted to this function than the Furuhashi system or the propagating-corona system.

In light of the understanding just outlined, other mechanisms will also come to mind for accomplishing the same objective—that is, substantially uniform ion density along the tube. For instance, the discharge tube might be made of ultraviolet-transmitting material, and very strong homogeneous excitation might be provided from a surrounding external ultraviolet lamp with a longitudinally continuous annular shape. Such a lamp might be in the form of a spiral, if it could be made to fire all at once.

All of the foregoing operational principles and advantages of the present invention will be more fully appreciated upon consideration of the following detailed description, with reference to the appended drawings, of which:

BRIEF DESCRIPTION OF THE DRAWINGS

FIG. 8 is primarily a longitudinal section, still in plan, of a discharge-tube assembly forming part of the FIG. 7 enclosure—except for the end windows. The left end of the assembly is shown in exterior plan rather than section. To represent the parts of the assembly of greatest interest at a moderately large scale, the assembly is drawn broken away near its center for omission of most of the long central segment.

FIG. 9 is an elevation, primarily in longitudinal section, of the same discharge-tube assembly—again with the windows and most of the central length omitted. The sectional portions of FIG. 9 are taken along the centerline 9—9 of both FIGS. 7 and 8; and FIG. 8 is taken along the centerline 8—8 of FIG. 9. Here most of the central structure of the assembly is shown in exterior elevation, rather than plan.

DETAILED DESCRIPTION OF THE PREFERRED EMBODIMENTS

Figure 1:
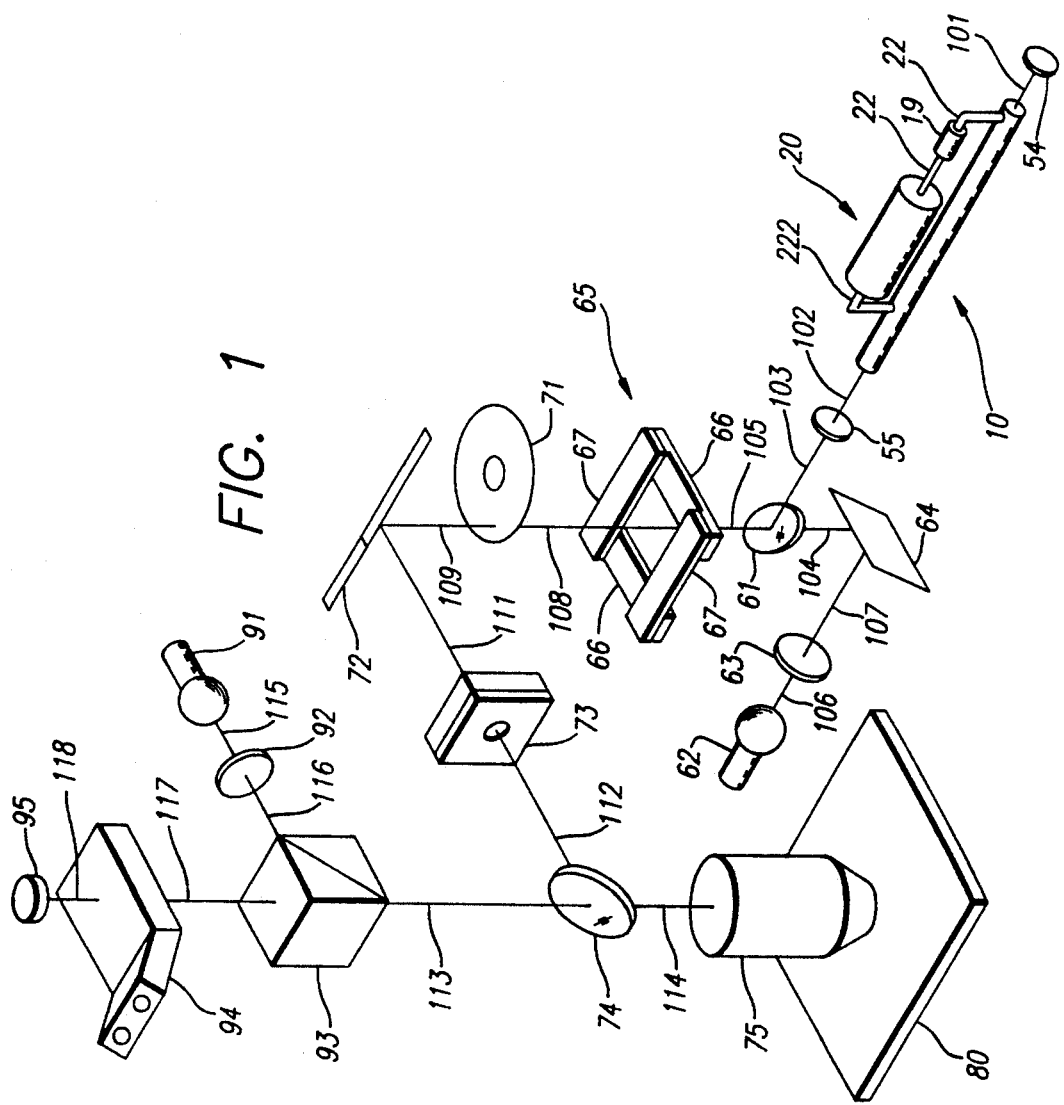
FIG. 1 is a schematic perspective drawing of the gas-enclosure elements, optical train, and target support of an excimer-laser system that is a preferred embodiment of our invention in accordance with all four of its above-described broad forms or aspects—except that the drawing includes a recirculating gas pump that is excluded from the first aspect.

As FIG. 1 shows, our invention preferably has an optical system comprising a sealed gas enclosure 10, 20. This enclosure includes a discharge-tube assembly 10, intercommunicating with a reservoir assembly 20 through a tubulation loop 22/222.

As appropriate in some broad aspects of our invention, a recirculating pump 19 may be placed in the tubulation loop 22, 222 as shown, or perhaps if preferred within the reservoir 20. For improved gas lifetime, however, the pump 19 should be kept in portions of the enclosure 10, 20 remote from the discharge. In certain broad aspects of our invention, as previously explained, no pump 19 is included—in which case the tubulations 22, 222 between the discharge-tube assembly 10 and the reservoir assembly 20 are uninterrupted.

The discharge-tube assembly forms with a highly reflecting end mirror 54 and a partially transmitting output mirror 55 a resonant optical cavity for laser radiation 101, 102. The mirrors 54, 55 are precisely spaced apart in a known manner. Thus positioning the mirrors outside the discharge-tube assembly prevents chemical reaction between metallic coatings on the mirrors and the halogen gases within the enclosure.

During the very short pulse times when the laser is actually operating, radiation 103 escaping from the resonant cavity 10-54-55 proceeds along an optical path 103 to a dichroic beam combiner 61. Here the laser radiation 103, when present, and visible radiation 104 from a targeting or so-called "spot marker" lamp 62 are both directed along a common optical path 105.

(Dichroic coatings on this device and mirrors in this system are speciality coatings. They must pass or reflect visible light in addition to the ultraviolet laser radiation.)

Visible light 106 from the lamp 62 advantageously passes first through a collimator 63 so that the visible-radiation beam very roughly simulates the focal properties of the laser beam. For convenience this beam is redirected by a planar beam-folding mirror 64—so that the targeting lamp 62 need not be below the overall system support surface (not shown).

Figure 2:
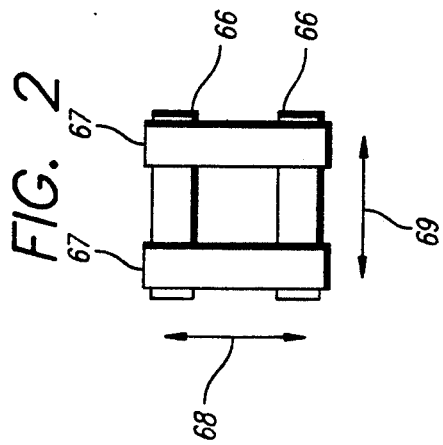
FIG. 2 is a plan view of the aperture-limiting mechanism used in the FIG. 1 preferred embodiment of our laser system.

In the preferred embodiment of FIG. 1, merged radiation in the common path 105 next proceeds to an adjustable rectangular aperture mechanism 65. Two aligned, opposed linear jaws 66 are mutually adjustable in spacing, along the direction indicated in the drawing by a double-headed arrow 68 (FIG. 2); and two similar orthogonal jaws 67 are mutually adjustable in spacing along the orthogonal direction indicated by another such arrow 69. Independent manual controls are provided for both pairs of jaws, so that the operator of the system can define the beam size and shape as desired over wide ranges.

The sized and shaped beam 108 from the aperture 65 passes next through a rotary (or if preferred linear) attenuator 71, controllable by the operator to reduce the laser-beam intensity if desired. (If preferred for brighter target illumination by the lamp 62, the attenuator 71 may be between the output mirror 55 and dichroic element 61.) Again for convenience the attenuated beam 109 is redirected by a folding mirror 72, to limit the "depth" or fore-to-aft dimension of the system.

Next the redirected beam 111 reaches an achromatic projection lens 73, which performs the first step of imaging the aperture upon a target. The lens 73 is advantageously achromatic so that the visible spot-maker image of the aperture mechanism 65 can be projected onto the target in substantially the same way as the ultraviolet laser-radiation beam defined by the same aperture mechanism 65.

This system preserves the needed coincidence of the spot marker with the actual working beam from the laser. A difficult and expensive achromat 73, however, is required to image acceptably the laser radiation of wavelength 308 nanometers or even lower. For work in the vacuum ultraviolet if desired, a reflecting element must be substituted.

The beam 112 from the achromat 73 is combined in a dichroic beam combiner 74 with target illumination 113 from a lamp 91, to form a composite beam 114 that is focused by a reflecting objective 75 onto the target 80. Before reaching the combiner 74, the light 115 from the target-illuminating lamp 91 has been precollimated by a lens 92, and then reflected at a prism 93 into the path 113-114.

A visible image of the target 80, illuminated generally by the light 115, 116 from the target-illuminating lamp 91—and also illuminated locally by the brighter spot-marker beam 107—returns upward along substantially the same path 114-113 through the dichroic combiner 74, and then through the prism 93 to the viewing-system input path 117. A binocular optical microscope 94 permits direct viewing of the target and spot marker, with simultaneous viewing (and recording, if desired) along a video-image path 118 by a video camera 95.

Figure 3:
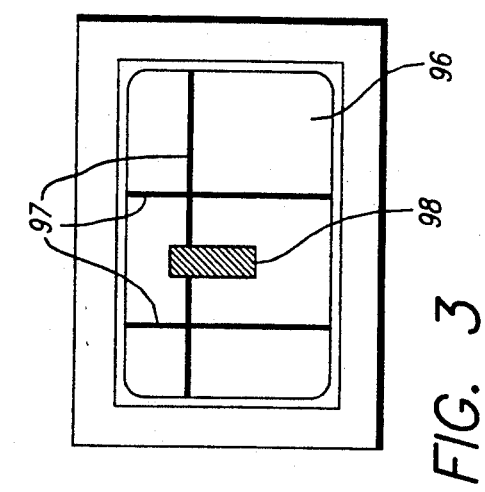
FIG. 3 represents a video or optical-microscope display of a target, with a superimposed rectangular representation of the area to be irradiated by the laser-beam, for a particular setting of the FIG. 2 aperture mechanism.

The image seen in the optical microscope or video display 96 (FIG. 3) accordingly includes the details of an integrated circuit 97 or other target—illuminated generally by light from the target lamp 91 and locally by the spot-marker image 98 of the aperture 65. The target 80 is advantageously disposed upon a microscope stage with fine vernier adjustment.

Thus, before firing the laser, the operator can maneuver the target 80 to bring a particular portion 96 into view and into desired alignment with the spot marker 98, and can modify the aperture image 98 as noted earlier, to select a particular area of the target for laser irradiation. When the laser operates, its radiation strikes very nearly the same image area 98, thereby irradiating essentially the selected target area.

The ordinary glass prism 93 and conventional refractive optics in the system 94, being highly absorbent of ultraviolet wavelengths, protect the operator's eyes and the video camera 95 against ultraviolet laser radiation reflected from the target. Thus the operator can continuously monitor the target condition as affected by successive pulses of laser radiation.

Figure 4:
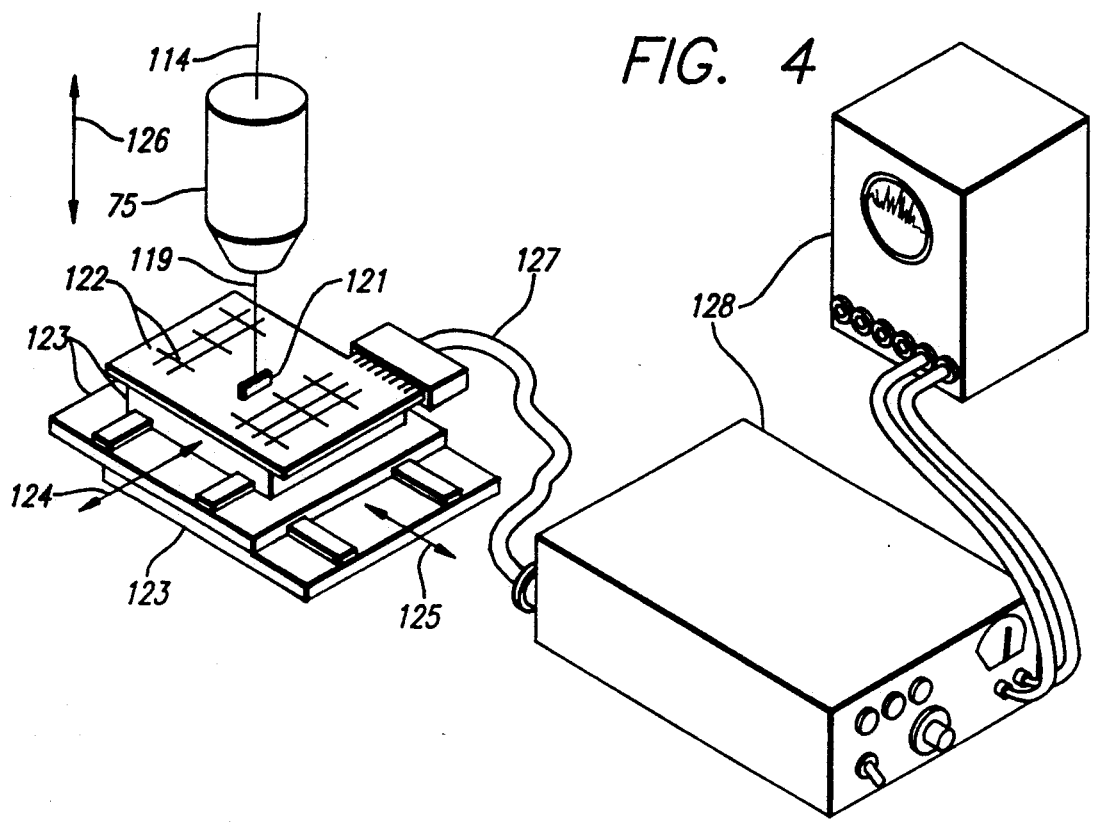
FIG. 4 is a highly schematic perspective view of target arrangements in a preferred embodiment of our invention as practiced for integrated-circuit failure analysis.

As FIG. 4 shows, in certain preferred embodiments of our invention the target 80 is an integrated circuit 121, disposed under the reflecting objective 75 directly in its irradiation-and-observation optical path 119. A microscope stage 123, shown schematically, supports the circuit 121 for finely controlled horizontal movement in orthogonal directions, while the objective 75 is adjustable vertically (or an adjustable stage elevator may be provided), as indicated by the arrows 124–126 respectively—all under control of the operator. A cartesian locating system as shown or other coordinate systems, such as circular, can be employed as desired.

Preferably the workpiece—i.e., the integrated circuit 121 to be modified—is functionally mounted in and connected with a control-and-evaluation circuit 122. This circuit 122 if desired may be on a circuit board characteristic or even representative of a normal operating environment of the workpiece circuit 121, except that the housing or packaging of the workpiece integrated circuit 121 normally must be removed for access of the radiation path 119 to the circuit 121 itself.

Through a multiple-wire bus or other suitable electrical harness 127, still further control-and-evaluation circuit elements 128 can be connected into the system. Thus the workpiece circuit 121 can be operated and its operation observed substantially continuously before and after, and in some cases even during, irradiation by the laser.

As a practical matter such operation is greatly facilitated by the unique compactness, portability and freedom from working laser-gas connections which result from our invention. The ideal matching of low-average-power levels with the power requirements of integrated-circuit failure analysis further favor our combination laser system illustrated in FIG. 4. We therefore believe that the overall working combination of the laser, coupling optics, workpiece-mounting arrangements, and control-and-evaluation circuit is far beyond the vision of any prior worker in this field.

Figure 5:
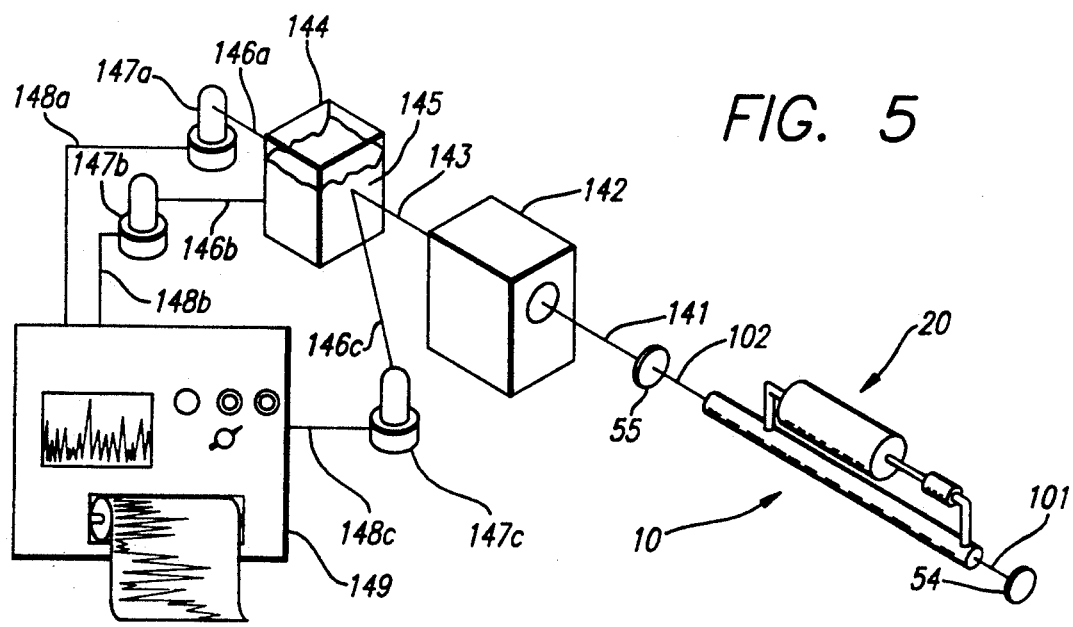
FIG. 5 is a similar view of preferred embodiments of our invention for spectroscopy, sensing or diagnostics. This is a compound view illustrating three embodiments.

Our laser system as embodied in spectroscopic, sensing and diagnostic systems is illustrated in FIG. 5. For convenience this drawing shows very schematically—in a single view—three alternative embodiments of our invention that most typically form three different apparatuses.

The enclosure 10, 20, mirrors 55 and resonant path 101–102 are substantially as in FIG. 1. Here the extracted laser radiation 141 from the output mirror 55 may first pass into coupling optics 142.

By the generalized optical coupling element 142 we mean to represent generically any of a great variety of conventional optical systems and arrangements. These include, for example, image-processing elements traversed by the laser beam both before and after interaction with a specimen.

They also include double-beam systems using choppers or splitters to obtain measurements relatively independent of the laser intensity; and other irradiation and sampling configurations. Myriad such optical systems and arrangements are well known in the field of spectroscopy.

Laser radiation 143 as thus preconditioned and/or postconditioned by the generalized element 142 reaches a sample cell or holder 144, which supports and in some systems also contains a specimen 145. In general, laser radiation 143 may in part traverse the specimen, a selectively attenuated portion 146a of the radiation emerging from the specimen 145 at a point, e.g., opposite the entry beam 143; and may in part reflect from the specimen, a selectively attenuated portion of the radiation appearing as a reflected beam 146b at very generally the same side of the specimen as the entry beam 143.

In addition the specimen may exhibit the phenomenon of fluorescence, or any of a great number of fluorescence-like phenomena such as Raman emission. In these cases, radiation resulting from the phenomenon of interest ordinarily issues from the specimen in directions (relative to the incident excitation provided by the laser) that are characteristic of the particular phenomenon involved.

Most typically, though not necessarily, such radiation is separated from the excitation by collection at an angle to the laser path. For example, such radiation may be found and collected along a right-angle path 146b from a side of the sample 145 or its cell 144.

In any of these three circumstances a receiver or sensor 147a, 147b or 147c of suitable wavelength sensitivity is disposed to intercept the radiation 146a, 146b or 146c respectively. The sensor develops in response a related respective signal 148a, 148b or 148c, usually electrical.

This signal inherently carries information as to the transmission (and absorption), reflection or fluorescence, etc. of the specimen. The signal is directed to an apparatus 149 for processing, refinement, interpretation, display and recording of that specimen information.

As desired, the information processing, refinement and interpretation can include development of quantitative- or qualitative-analysis data for the particular sample, or data reflecting the history of the specimen, or even the development of environmental conditions causing that history, etc. Many such apparatuses are well known and suited for use as part of our FIG. 5 combination laser system.

Because of the very high sensitivity of typical sensors 147a-c, the average-power demand of systems such as those represented in FIG. 5 is very low. This is particularly true of transmission and reflection measurements; and can also be true for fluorescence measurements, if they are enhanced by various conventional refinements. For example, synchronous-response subsystems make optimum use of the very high power—on the order of ten to twenty kilowatts—available from our laser on an instantaneous basis.

Hence, here again, our system provides a near-ideal matching of low-average-power levels with the power requirements of spectroscopic applications. In such work our laser offers relatively low cost, minimal space requirement, and ready movement within a laboratory from one such analytical instrument to another—particularly without any need for bringing along expensive, cumbersome and sometimes hazardous halogen-gas exhaust ports and the like. These characteristics give the embodiment of our invention as seen in FIG. 5 a striking advantage, beyond expectation of other skilled workers in this field, over prior laser-excited spectrometers.

Figure 6:
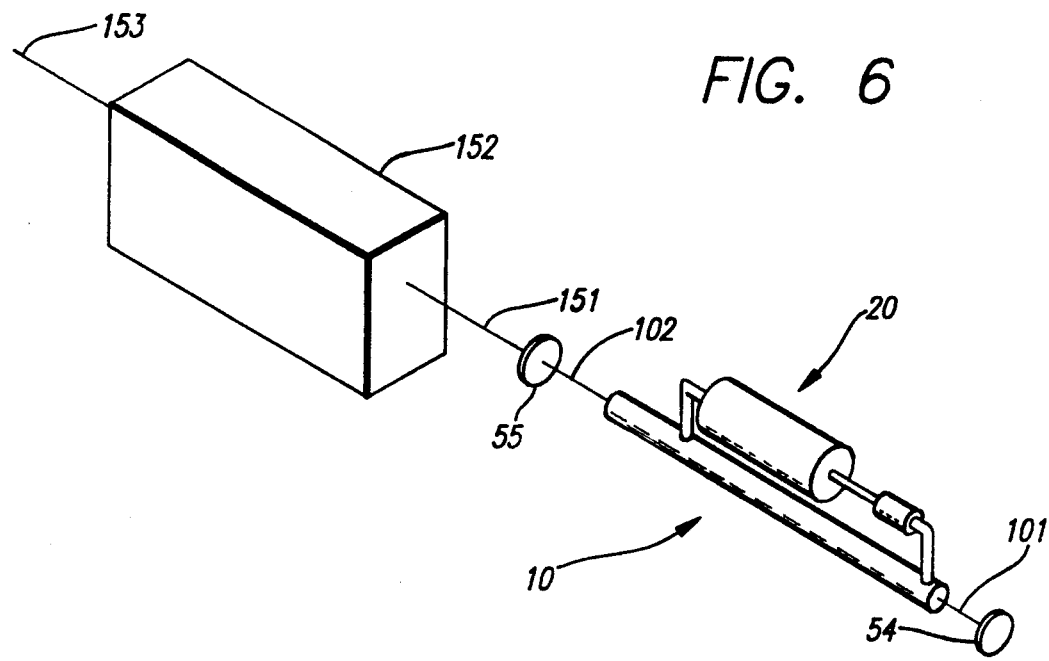
FIG. 6 is a similar view of an embodiment of our invention in a laser amplifier, and particularly as the first stage of such an amplifier.

FIG. 6 shows our invention embodied in a laser amplifier, which includes as its first or primary pumping stage our low-average-power laser. The resonator 10, 20, 54, 55, with resonating radiation 101, 102, is generally as before.

Here the extracted laser radiation 151 enters a second stage 152, which may be for example the first stage of a dye-laser laser amplifier, or any of various other laser devices pumped by the radiation 151. Working radiation 153 from the second stage is directed to a target for use in known ways.

If the second stage is a larger excimer laser, such as for example a transversely discharged excimer type, then in addition the high photon energy and very high instantaneous power of the ultraviolet first stage possibly may be exploited to provide unusually uniform preionization for the second stage. Our FIG. 6 combination ultraviolet laser system is uniquely well adapted for such use by virtue of its full beam pattern—that is, a circular rather than annular cross-section—and once again its exceedingly high instantaneous power over the short lifetime of the excimer species.

That short lifetime presents little or no drawback in the context of our FIG. 6 system, since pumping (or even preionization) of the second stage must typically occur over intervals that are at least as short. For these reasons and others that will be clear to those skilled in very advanced aspects of excimer-laser design and operation, our combined system of FIG. 6 offers developmental potentialities that far exceed the contemplation of skilled workers in this field heretofore.

As FIGS. 7 through 13 show, the discharge-tube assembly 10 in a preferred embodiment includes a capillary discharge tube 11 (in the appended claims often called just "the tube"), a main-discharge cathode chamber 12 and anode chamber 212, and two end segments 14, 214 respectively fused to and communicating with the cathode and anode chambers 12, 212. Each electrode chamber 12, 212 is fitted over and sealed (in a graded seal) to one respective end of the capillary tube 11, so that the interior 211 of the capillary communicates with the interior of each chamber 12, 212 (FIGS. 8 through 11). Each end segment is terminated by a respective angled planar window 15.

For mounting of the windows 15, the end segments 14 are cut off at the well-known Brewster angle (56°4' for 308-nanometer radiation), needed for optimum transmission through the window. The resulting cut-off cylindrical ends form planar mounting surfaces 18 (FIGS. 8 and 9), each surface 18 having in plan the shape of an elliptical annulus.

Figure 13:
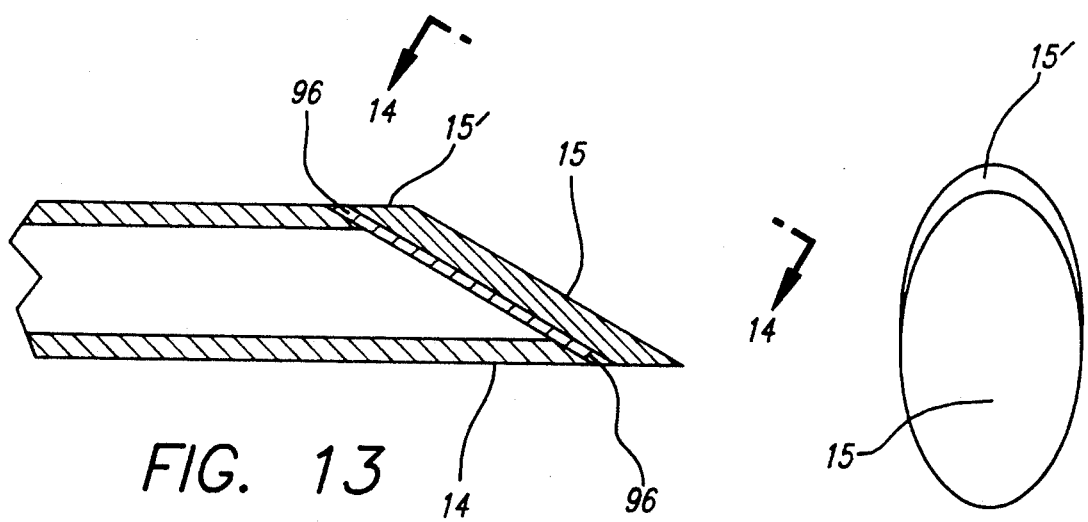
FIG. 13 is an enlarged elevation, in longitudinal section, of a representative one of the two extreme ends of the discharge-tube assembly of FIGS. 7 through 9—but here showing the attached end window.
Figure 14:
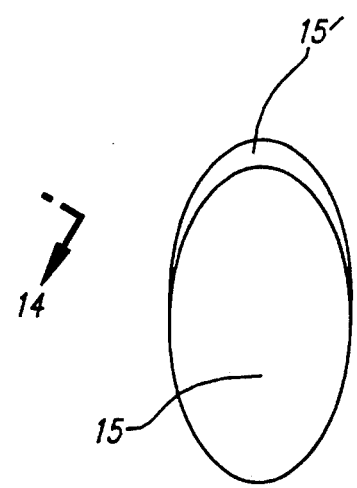
FIG. 14 is a view of one end window taken normal to its transmitting surface, along the line 14—14 of FIG. 13.

Correspondingly, each window 15 is preferably formed, as is conventional, with its two planar surfaces 15 cut to an ellipse in plan. The two elliptical-plan planes of each window are slightly offset along their major axes to provide progressively bevelled edges 15' (FIGS. 13 and 14).

The bevelled elliptical-plan windows 15 are arranged on the respective elliptical-annular-plan cut-off mounting surfaces 18 so that the windows form neatly cylindrical extensions of the end segments. In addition to creating a tidy appearance, this configuration reduces the likelihood of damage. The windows are fixed in place using a low-vapor-pressure resin 96 (FIG. 13).

The cut-off ends 16 of the discharge tube 11 terminate just inside the cathode and anode chambers 12, 212 respectively. Coaxially suspended by a pair of electrical feed-through pins 13 within each of these chambers 12, 212 are a main-discharge cathode 31 and anode 231 respectively.

The feed-through pins 13 are fixed to the electrodes 31, 231 by spot welds 32, and fixed in the walls 12, 212 of the chamber by graded seals 33. The pins provide to the main-discharge electrodes 31, 231 both mechanical support and electrical connection.

The reservoir 20 has a generally cylindrical wall 21 (perforated at two points for sealed attachment of the two communicating tubulations 22, 222 that lead to the discharge-tube assembly 10) and two attached generally planar end walls 23, 24. As will be evident, the reservoir configuration is somewhat arbitrary; for example, the end walls may be given planar, domed, or other convenient shapes as preferred.

One end wall 24 of the reservoir is also advantageously perforated for attachment of a communicating tubulation 25 that leads to a valve body 26. This valve body 26 communicates at one end with a dead-end chamber 28, which has been sealed off by a substantially permanent type of seal 27 in a manner and for a purpose to be described. The dead-end chamber 28 is stabilized to the reservoir end wall 24 by a solid rod 29, which is fused to both the chamber and the reservoir wall.

Protruding outward from this valve body 26 is a valve handle 51, attached to a valve core 52. By virtue of O-ring seals 53, the core makes a very close fit in the valve body.

At the bonnet side of the valve body—that is, the "external" side, from which the handle 51 protrudes, and which is toward the top of the drawing—the O-ring seals isolate the gas enclosure from ambient. We prefer to use two seals in series at this point.

At the other end of the valve body—the "internal" side, that controls communication between the reservoir 20 and the dead-end chamber 28—the O-ring seal serves, when the valve is closed, only to isolate the gas enclosure from the dead-end chamber. There we consider a single seal adequate.

We prefer to make the discharge tube 11 of a mullite ceramic (combined aluminum and silicon oxides, dielectric coefficient approximately 8), and the transmitting end windows 15 of a very high grade of fused quartz— preferably that which is commercially available under the registered trademark Suprasil. We prefer to make the rest of the gas enclosure (that is, the remainder of the discharge-tube assembly, the entire reservoir, and the interconnecting tubulations) of the familiar stress-resistant laboratory-quality glass composition available under the registered mark Pyrex.

The electrodes 31, 231 we make of tantalum, and the feed-through pins 13 of tungsten. The valve core 52 and its O-ring seals 53 are of the materials available commercially under the registered trademarks Teflon and Viton, respectively.

Except for these last two, all the materials just enumerated are far more resistant to reaction with halogen gases than the constructional materials of prior transversely discharged systems, and of the prior longitudinally discharged systems discussed above. We prefer to treat the materials after assembly, in ways that will be detailed shortly, to enhance this resistance.

As to the Teflon and Viton, it can now be seen that—as mentioned in an earlier section of this document—they are relatively remote from the discharge volume where gases are hottest and most reactive. Moreover, relatively very small surface areas of these two materials are exposed to the enclosure interior.

The purpose of the blind-valve/glassblown-seal assemblage 25-29, 51-53 is to provide a convenient means of sealing the gas enclosure in a substantially permanent type of seal. This is particularly appropriate when the gas pressure in the enclosure somewhat exceeds atmospheric pressure. Optimum operating pressure for our laser system is roughly 800 torr, or about five percent greater than atmospheric.

Under those circumstances, forming a glassblown seal with the seal-off point exposed to the interior of the reservoir is difficult. The Pyrex, upon being softened, tends to expand outward and soon explode—destroying the hermetic character of the enclosure and of course releasing the gases.

The large volume of the gas enclosure works against the desired procedure. Expansion of the chamber wall in a seal-off area produces very litle fractional decrease in the gas pressure that is driving the softened material; hence expansion continues until the integrity of the enclosure fails.

This difficulty can be overcome by using the valve 51-53 to isolate the laser enclosure from the gas-handling and vacuum system; then the latter is pumped down to a low pressure. A small dead-end chamber 28 is then easily created by sealing off the system at a point 27 very close to the valve 51-53.

In principle, other methods of overcoming the relatively small excess pressure above ambient might in principle be employed, without using a valve. For example, a structure possibly could be incorporated into the assembly to serve temporarily as a cryogenic trap, for use in lowering gas pressure within the enclosure during the glassblowing operation.

Alternatively the glassblowing operation possibly could be performed with the whole gas enclosure inside a pressurized glove-box chamber, using sealed manual-access feedthroughs to control the torches and Pyrex components. Instead, if preferred, the glassblown seal might possibly be replaced entirely by a substantially permanent seal of another type less sensitive to slight overpressure within the gas enclosure—for example, a metallic pinch seal, in which sufficient pressure is exerted to fuse opposite walls of a metallic tube.

Our best present findings, however, are that (1) the valve, chamber and glassblowing procedure in combination yield a reliable seal of a substantially permanent type; and more importantly that (2) the materials of the valve and O-rings—exposed within the enclosure but far from the discharge-tube assembly—have no noticeable adverse impact on gas purity or life. Accordingly this is the form of the seal we now prefer.

If the handle 51 were operated to open the valve, the tubulation 25 and thereby the gas enclosure 10, 20 would communicate through the valve with the small dead-end chamber 28. Therefore, merely as a matter of terminology for certain of the appended claims, we note here that the valve "leads to" that chamber, not to ambient; and furthermore that the valve "is sealed off" by the substantially permanent seal 27 "against communication with ambient".

If the valve bonnet seals were to leak, or of course if the core were removed or the valve body broken, then under such extraordinary conditions the tubulation 25 and gas enclosure 10, 20 would communicate through the bonnet with ambient. For purposes of this document, however, we define our terms "leads to" and "is sealed off . . . against communication with ambient" to exclude the extraordinary conditions.

We prefer to follow the procedure below in manufacturing our discharge-tube assembly and attached reservoir. We regard these steps as very important, although none is novel:

1. preparation of the main discharge electrodes 31, 231, including shaping, welding, sealing by feed-through pins 13 to the electrode chamber wall 12, 212, and cleaning;
2. glass and ceramic tube work for completing the discharge-tube assembly 10 with its two main electrodes 31, 231 in their chambers 12, 212 and the two end segments 14 cut off at the Brewster angles;
3. cleaning of the discharge-tube assembly 10 successively with acid, acetone, methanol and deionized water;
4. connecting that assembly 10 with the reservoir 20, and then to a vacuum-and-gas-handling station (not shown);
5. cementing the Brewster windows 15 to both ends of the discharge-tube assembly 10;
6. pumping the gas enclosure down, including flaming or torching the assembly (heating the assembly with a torch) to promote outgassing of all interior surfaces;
7. cementing the dielectric "wings" 41 onto the two sides of the ceramic capillary discharge tube 11;
8. forming preionization electrodes by means of metal coating on the upper and lower sides of the capillary 11;
9. filling the gas enclosure with passivating gas—mainly neon and about ten percent hydrogen chloride—at roughly sixty to seventy torr and holding for twelve hours; then pumping down to roughly $10^{-5}$ torr;
10. filling the enclosure with active gases at the preoptimized ratio;
11. running the laser for more than $10^5$ shots;
12. pumping off the gas and refilling to an optimum mix; and
13. sealing off the gas enclosure from the vacuum and gas-handling station.

In this procedure, steps 9 through 11 are important for rendering the interior surfaces of the enclosure and other exposed surfaces "passive"—that is, both literally not reactive with the gases that remain in the chamber at step 13; and also unable to function later as sources of residual contaminating gases. Thus in particular the optimum form of step 9 varies with the character of the wall materials and other details.

If in step 9 the "passivating" gas mixture remains too long, or the pressure is too high, wall surfaces can later appear to be gas sources. Some inverse relation appears between the pressure and the duration of this step; and the operation is extremely sensitive to the hydrogen-chloride partial pressure.

Step 11 seems to draw other gas species out of the wall, as if the wall itself were being pumped. It accordingly accelerates cleanup of the system.

Metallic coatings 35 and 36 (best seen in FIGS. 9 through 11) are disposed along almost the entire top and bottom external surfaces, respectively, of the discharge tube 11—with continuous extensions 34 and 234-334-434 onto the cathode and anode chambers 12 and 212 respectively.

The upper coating 35 and its extension 234-434 serve as positive preionization electrodes. The lower coating 36 serves as a negative preionization electrode. For best conduction and therefore most uniform preionization voltage along the capillary, we prefer to make the coatings of silver.

By virtue of the geometry and materials of the preionization electrodes (as well as the resulting performance) it can now be appreciated that the voltage—and hence the resulting preionization ion density—along our tube are far more uniform than in all earlier longitudinally discharged devices. We accordingly believe that the criterion of "substantially uniform" ion density is easily satisfied by the device we describe here, and not satisfied by the earlier units.

In operation these electrodes are capacitively coupled through the tube wall 11 to gases in the tube interior 211. For connection purposes a very short multilayer-foil copper or aluminum strap 44 is secured adjacent to the discharge-tube assembly, and extends above the assembly to a firm silver-glue contact 46 (FIG. 7) with the upper coating 35. A similar strap 48 is secured and glued below the assembly to make a like contact (not shown) with the lower coating 36.

A dielectric baffle structure 41-42-43 (seen most clearly in FIGS. 8, 9 and 11) attached along opposing lateral surfaces of the discharge tube 11 serves to isolate the metallic coatings 35 and 36 from each other electrically. The baffle structure presents the appearance of two longitudinally extending and laterally projecting diametrical wing-like panels.

Added isolation, and structural rigidity, are obtained by affixing radially extended flanges 43 (FIG. 11) and 42 (FIG. 9) to the ends of the "wing" panels 41 at right angles. Each flange 43, 42 extends halfway around the tube, connecting the opposed "wings" together.

One flange 43 projects generally upward and the other 42 generally downward. We prefer to make the baffle as three separate pieces 41, 42, 43 of acrylic (dielectric coefficient between 2 and 2.5), and to secure them together and to the sides of the mullite capillary with silicone rubber.

The upper and lower metallic coatings 35, 36 stop at, or just short of, the upper and lower baffles 43, 42 respectively. At the unbaffled end of each coating, however, the upper and lower coatings extend longitudinally as coatings 34, 234 on and along the respective adjacent ends of the discharge tube 11.

At the cathode end of the capillary 11, the coating 34 continues along the bottom of the capillary, about two millimeters past the end of the baffle 41, 43, onto the exterior surface of the graded seal into which that end 16 of the tube 11 projects—and so onto the outside of the cathode chamber 12 itself. The coating 34 then extends upward to encircle the seal and the chamber 12. The coating 34 spreads over the entire outer surface of the chamber 12, ending where the tubulation 22 and end segment 14 protrude from the chamber 12.

At the anode end of the capillary 11, the coating 234 extends along that tube 11 longitudinally beyond the baffle flange 42—but only on the upper half of the tube 11. The coating is continued onto the outer surface of the main-anode chamber 212, in a generally vertical, radial spoke-like stripe 334 (shown particularly in FIG. 10, but also seen in FIG. 7) that diverges into a broad annular stripe 434.

In consequence of this extension 234-434 of the preionization anode, additional preionization occurs within the anode chamber 212—between the main anode 231 inside that chamber and the preionization-anode extension 434 on the outside of the chamber wall. Here, however, preionization voltage arises as the difference between the voltages on the main anode 231 and preionization anode 35, rather than the difference between the voltages on the preionization electrodes 35, 36.

We have found that the use of this metallization geometry is particularly helpful in achieving effective preionization. Of the total increase in laser pulse energy obtained by providing preionization, our inclusion of this metallization on the anode chamber 212 accounts for, very roughly, thirty percent.

Thus we have been able, with the metallization pattern described above, to raise the reliable pulse energy of our system from 180 or 200 microjoules without preionization to 400 and even 450 microjoule with preionization. Of this overall 180- to 250-microjoule increase, a component of very roughly sixty to seventy microjoules is correlated with provision of the anode-chamber extension 234-434 of the preionization-anode metallization.

In our extensive work of completing our invention, we also extended the anode coating 35 in a similar annular pattern onto the cathode chamber 12, in hopes of obtaining a similarly improved preionization in that chamber and like energy increase. No useful improvement, however, resulted. We speculate that this difference in performance arises from the different behaviors of the predominant ionic species near the two electrodes 31, 231 respectively.

Accordingly we employ a full enclosure of the cathode chamber by the metallization extension 34 from the capillary 11. This metallization 34' on the cathode chamber, connected directly to the main-discharge cathode 31 via its feedthroughs 13, simply minimizes inductance and resistance between the main and preionization cathodes.

Figure 15:
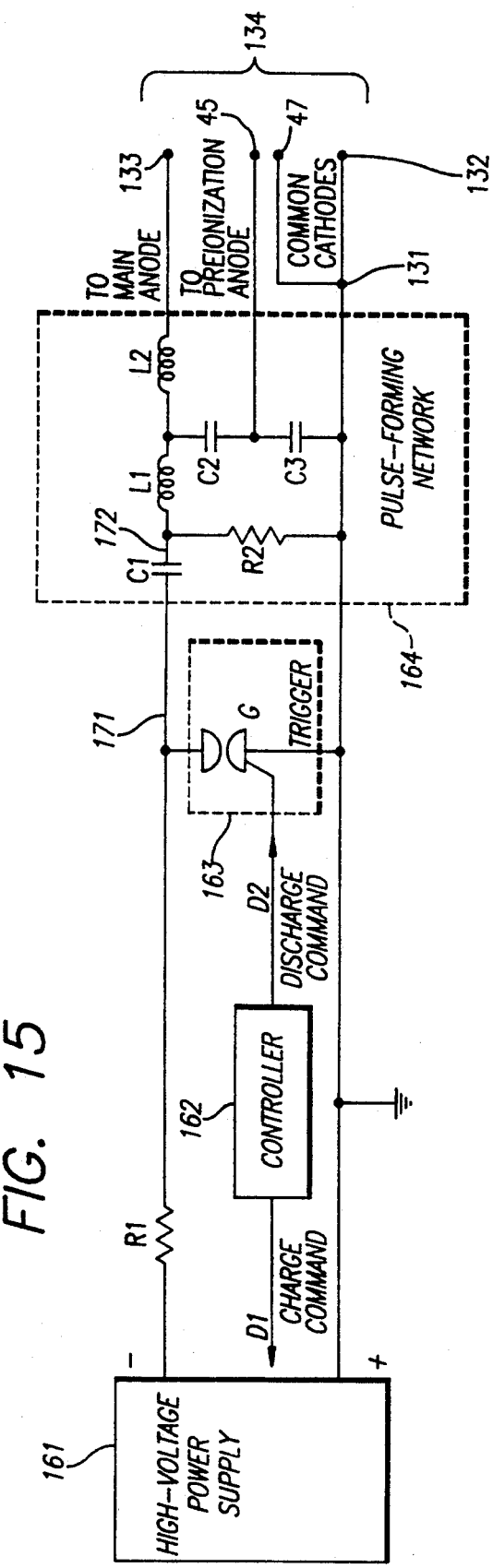
FIG. 15 is a combination block diagram and partial electrical schematic of a pulse-forming network used to apply electrical voltage to the discharge-tube-assembly electrodes, in a preferred embodiment that is in accordance with all four above-described broad forms or aspects of our invention.

As indicated in FIG. 15, electrical excitation from a high-voltage negative power supply 161 is applied—through a single pulse-forming network ("PFN") 164—to the main-discharge electrodes 31, 231 and to the preionization electrodes 35, 36 of our discharge-tube assembly 10.

For the main discharge, PFN output voltage is applied via a simple transmission line 134—wiring with a coupling inductor L2 to match the effective impedance of the discharge-tube assembly for maximum energy transfer. The preionization anode 35, however, receives voltage from the PFN 164 directly.

Figure 16:
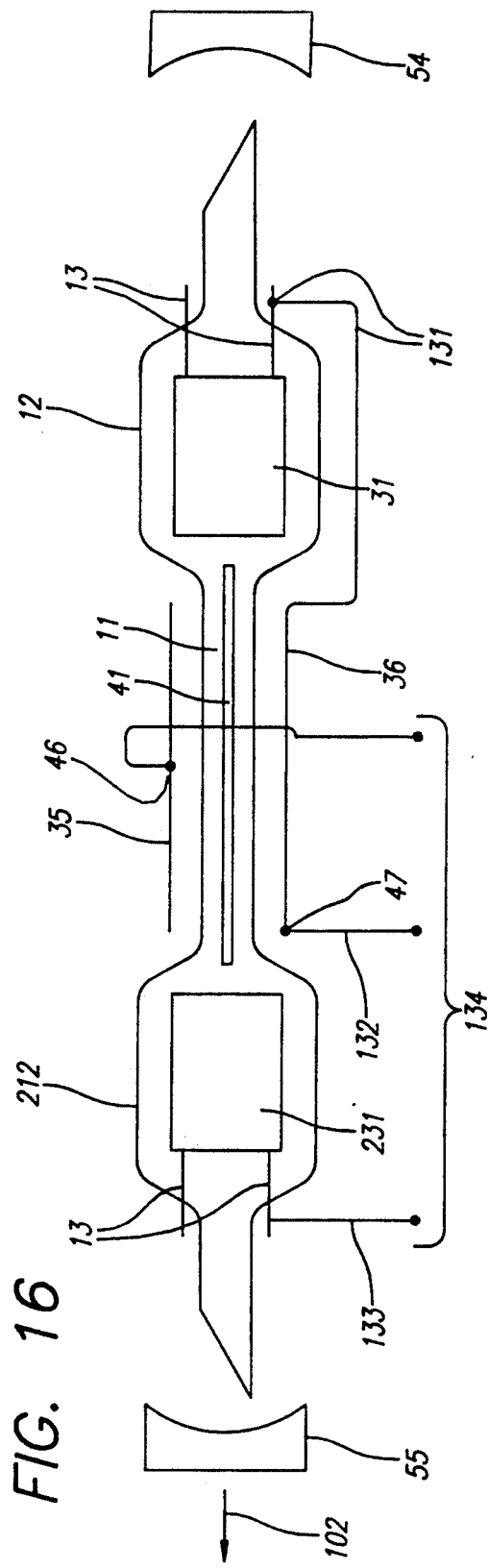
FIG. 16 is a schematic view of the discharge-tube assembly of FIGS. 7 through 9, showing electrode interconnections as well as connection to the FIG. 15 pulse-forming network.

FIGS. 15 and 16 show that the main-discharge and preionization cathodes 31, 36 are connected in common at a point 131. That point corresponds to the metallization 34' on the main-cathode chamber 12 mentioned just above.

Voltages for both the preionization and main discharges are thus drawn from a single PFN 164, in which almost all the components are used to drive both discharges. This new system has important advantages, including inherently close, easy control of critical timing and voltage relations between the two discharges, and significant circuit-fabrication economies.

Within the excitation circuit, operation of the laser is initiated by a clock-controller 162, which is manually preset for the desired repetition rate. The controller 162 issues two command signals in sequence: a first "charge" command D1 to the high-voltage supply 161, to charge a storage capacitor C1 in the PFN 164; and then a second "discharge" command D2 to a trigger 163 which applies the energy in the storage capacitor C1 to fire the laser. (As used here the term "discharge" refers to discharge of the capacitor C1, rather than the gas discharges in the laser discharge-tube assembly.)

In the first part of this sequence, a resistor R1 limits the charging rate of the storage capacitor C1, to protect that capacitor and the high-voltage supply 161. Another resistor R2—a relatively small, wire-wound unit—essentially grounds the output side of the storage capacitor C1 during this relatively slow charging process.

The trigger 163 is a conventional spark gap G, obtained from EG&G Electronic Components of Salem, Mass., as that firm's Model GP-46B with SBV of forty-five kilovolts. We operate the unit at sixty to eighty percent of that value.

Once actuated, the trigger 163 essentially grounds the input side 171 of the storage capacitor—i.e., the side which was its current-input terminal during charging. That capacitor C1 then discharges very quickly through a timing-trimmer inductor L1 into the remainder of the PFN and the transmission line 134.

The initial discharge rate of the storage capacitor C1 is limited only by the inductances of the timing trimmer L1 and spark gap G, and intrinsic inductances of the other circuit elements and connections—and to a much lesser extent (as there is no main gas discharge in the discharge-tube assembly) by the inductance of the output coupler L2. As these are all quite low, and circuit capacitances are as well, the PFN is very fast. On the resulting time scale, inductive impedance of the wire-wound resistor R2 is very high, making it virtually an open circuit; thus at this stage it can be disregarded.

Figure 7:
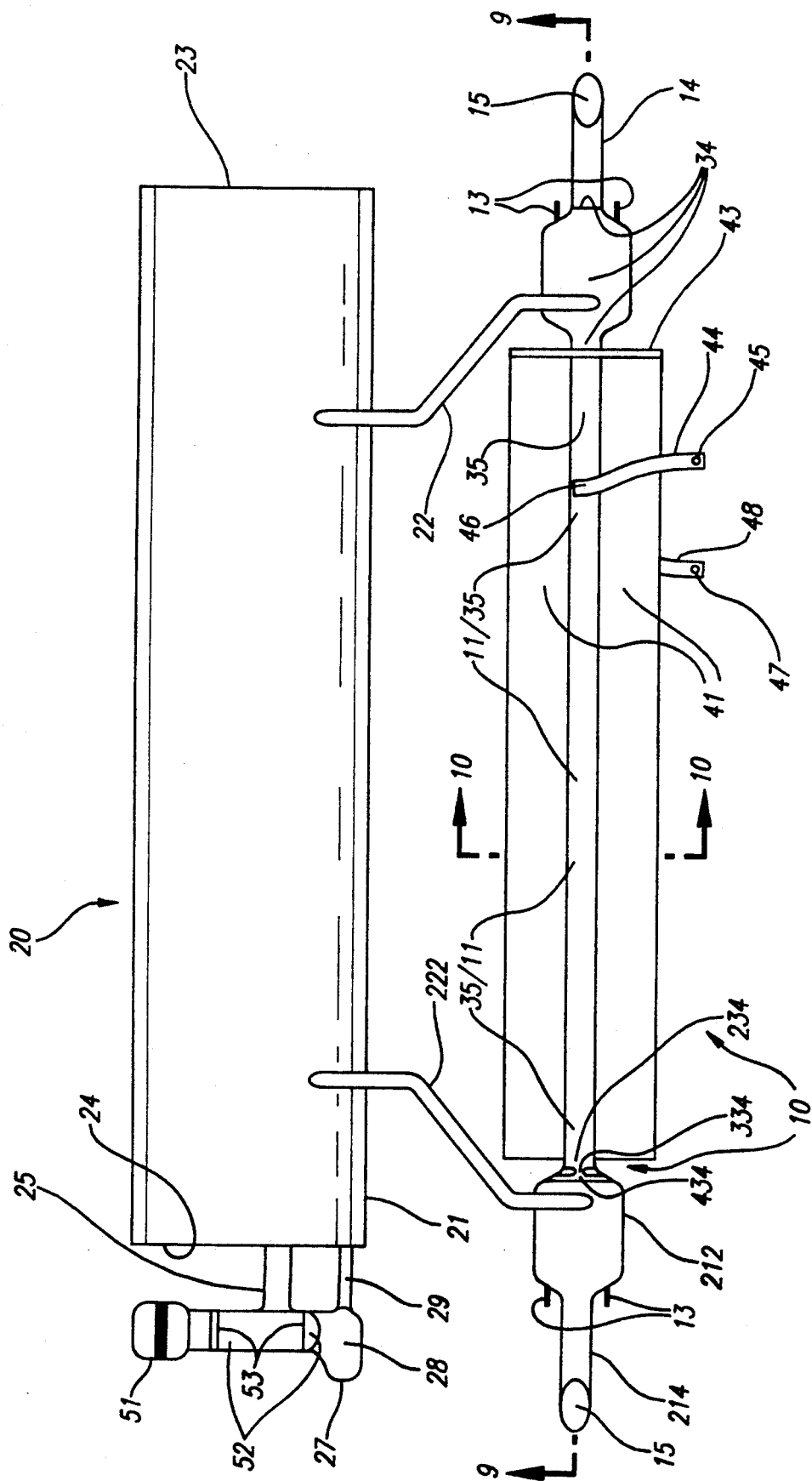
FIG. 7 is a plan view of only the gas-enclosure elements of the FIG. 1 system, in greater detail and shown together with certain intimately associated electrical components.
Figure 11:
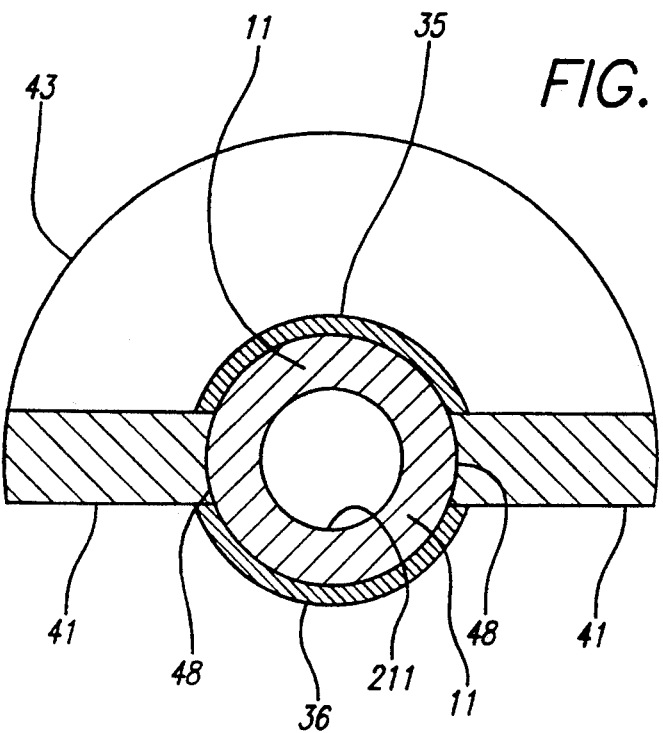
FIG. 11 is a cross-sectional elevation, taken along the line 10—10 of FIGS. 7 through 9 and considerably enlarged, of only the capillary or "tube" portion of the discharge-tube assembly, with its accompanying metallization and dielectric baffle—including a radial-flange portion of the baffle.
Figure 10:
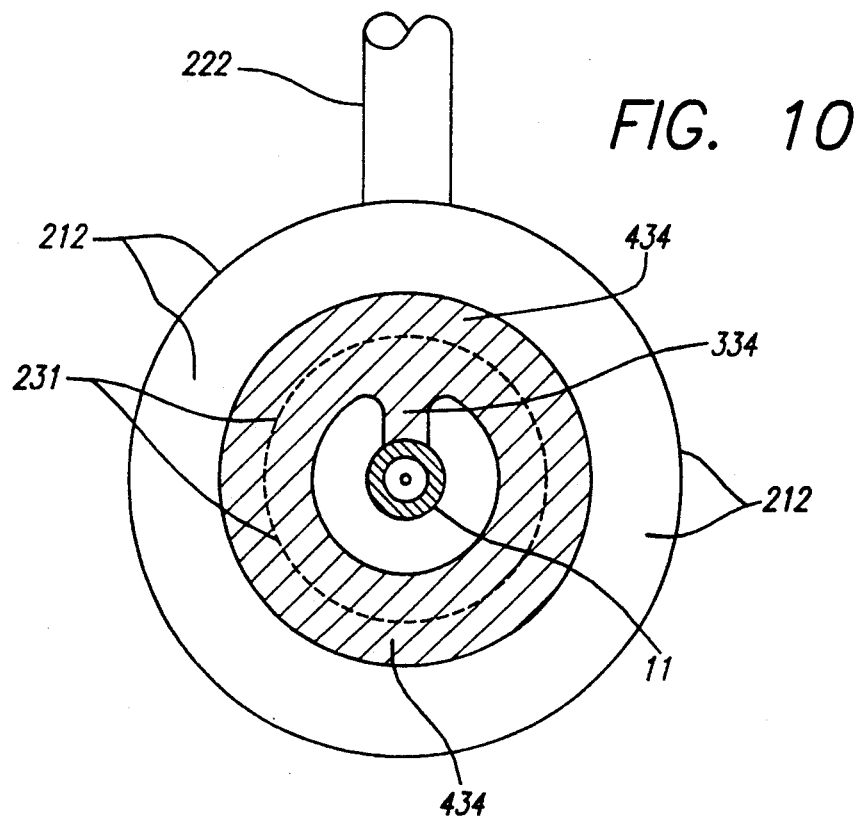
FIG. 10 is an elevation, taken along the lines 10—10 in FIG. 7 through 9 and partly in cross-section, showing a metallization pattern on the exterior of one electrode chamber that forms part of the discharge-tube assembly.
Figure 12:
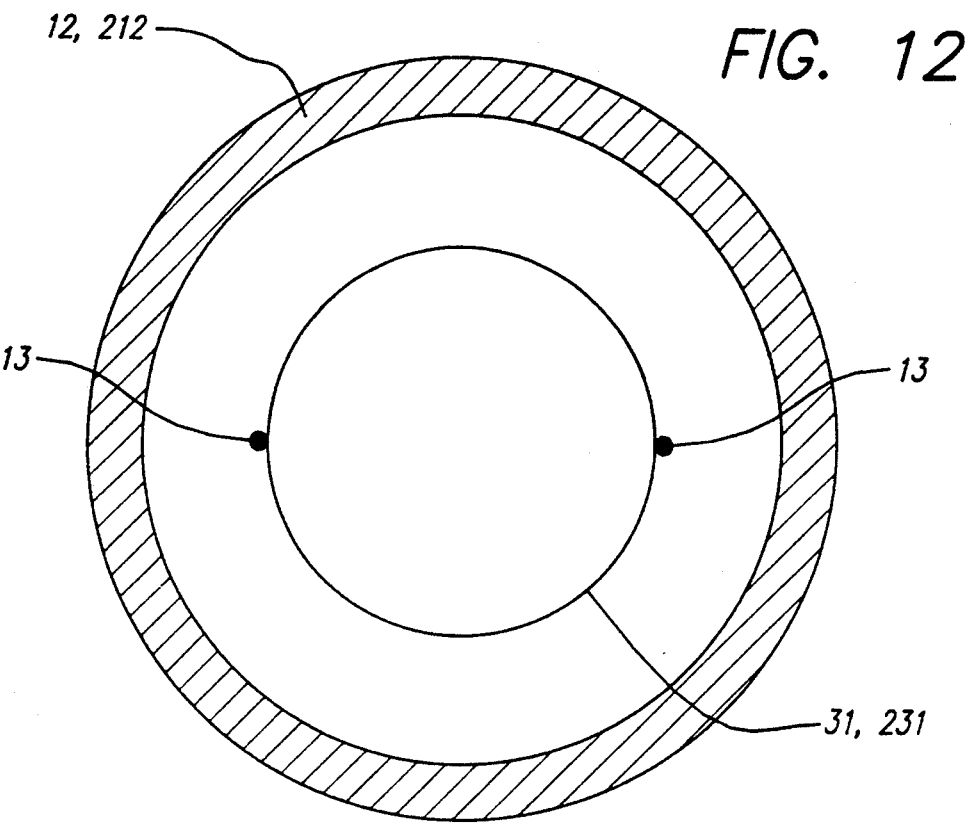
FIG. 12 is a cross-sectional elevation of a representative one of the two electrode-chamber portions of FIGS. 7 through 9, taken along either of the lines 12—12 that appear at the ends of those drawings.

Discharge of C1 thus charges a peak-voltage capacitor C2 and a preionization coupling capacitor C3. As the voltage is being established across capacitor C3, it is simultaneously applied to the preionization electrodes 35, 36 by way of the preionization-electrode connections 45, 46, 47 and respective contact straps 44/46, 48 (FIG. 7). This voltage (or, more specifically, the rate at which it changes) causes a weak transverse corona discharge between the two preionization electrodes 35, 36—through the ceramic discharge capillary walls 11 and the gas mixture within the tube interior 211.

Rising voltage across both capacitors C2 and C3 in series is applied simultaneously through the coupling inductor L2 to the main-discharge electrodes 31, 231. Initially this voltage is inadequate to significantly affect gases in the assembly.

About twenty to twenty-five nanoseconds after the corona starts, however, the main high voltage across the transmission-line terminals 132, 133 exceeds the static breakdown voltage between the main electrodes 31, 231. A few nanoseconds later the main glow discharge begins, and then after another few nanoseconds the lasing action begins.

In our system the timing relationship between the preionization and main discharges is determined by the three capacitors C1-C3, the timing trimmer L1, the inductance of the spark gap G, and intrinsic inductances of the capacitors and wiring. These simple means of control are an important improvement: timing effects between the controller 162 and the gap G affect both discharges equally and so are immaterial.

Selection of the capacitors C1, C2, C3, however, must be done very carefully, for their ratios also affect voltage and energy delivery to both the preionization and main electrodes. As an extreme case, if C3 is too small in relation to C2, excess preionization voltage may cause dielectric breakdown of the mullite capillary, disabling the preionization system.

To achieve control of the interdischarge timing—that is, the relative timing of the two discharges—almost independently of voltage and energy, therefore, we include a trimming inductor L1. Its use will be detailed shortly.

Figure 17:
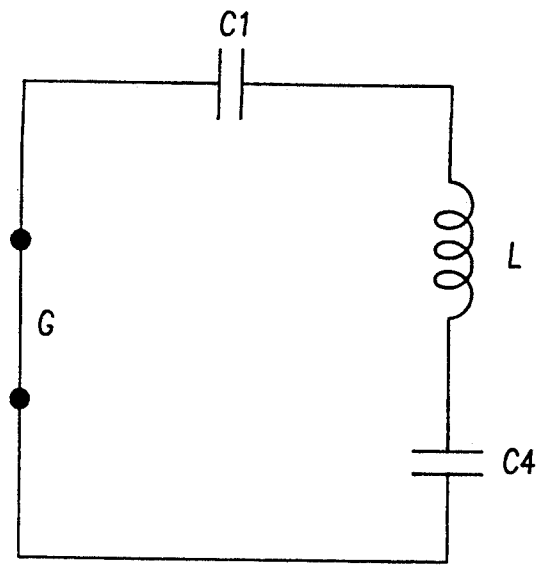
FIG. 17 is an electrical schematic showing, for discussion purposes only, a conceptual simplification of portions of the FIG. 15 network—particularly in terms of actual series capacitance, actual inductance, and a lumped output capacitance.

During the very fast operation of the PFN, the network may be usefully represented—at least for purposes of discussion and analysis—by the simplified effective circuit shown in FIG. 17. In this circuit, we define C4 as the combined series capacitance of the capacitors C2 and C3, so that $$\frac{1}{C4} = \frac{1}{C2} + \frac{1}{C3}$$

or $C4 = C2 \cdot C3/(C2+C3)$. We also define $L = L1 + L_G + L_I$—where $L_G$ is the inductance of the spark gap (typically five to thirty nanohenries) and $L_I$ is the intrinsic inductance of the capacitors, wiring and other circuit elements (typically fifty to one hundred nanohenries).

Figure 18:
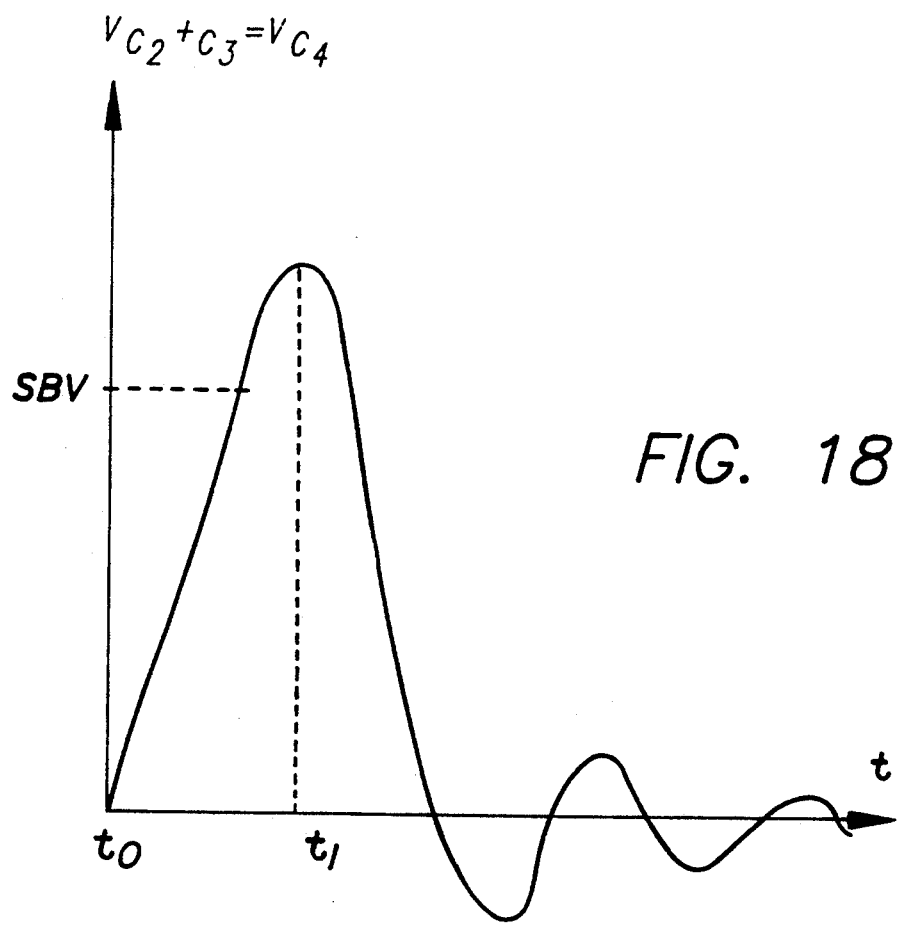
FIG. 18 is a representative or somewhat schematic timing diagram—specifically, a graph of voltage across the lumped capacitance of the FIG. 15 and FIG. 17 network, vs. time—particularly showing the delay interval between the commencement of preionization and the commencement of the main discharge in the discharge assembly of FIGS. 7 through 9 and 16.

Time variation of the voltage across C4—that is, across C2 and C3 in series—is generally as graphed in FIG. 18. The rising voltage across the main-discharge electrodes is generally similar, but differs slightly by the voltage on the output coupling inductor L2.

The starting time $t_0$ in FIG. 18 is typically just over a hundred nanoseconds after the controller 162 (FIG. 15) nominally issues its discharge command D2. This delay arises partly from short but variable delays within the controller 162, and mainly the startup mechanisms of the spark gap G.

It is important to note again that in our system these sources of delay, being common to both the preionization and main discharges, are totally inconsequential—even if they drift drastically. They need not be controlled or monitored.

In previous systems using two separate PFNs, all triggering delays for the two PFNs are critical, because their difference appears directly as a term in the overall delay between preionization and main discharges. Thus in previous systems all sources of triggering delay must be carefully matched or otherwise controlled—or both.

About twenty to twenty-five nanoseconds after startup time $t_0$, as noted earlier, the output voltage $V_{C4}$ reaches the static breakdown voltage SBV for the main discharge; a few nanoseconds later, at time $t_1$, that discharge begins. Then the PFN is loaded—by energy drawn into the discharge, and by the low characteristic voltage across the discharge.

This loading causes the supply voltage $V_{C4}$ to fall abruptly and then ring down. This behavior is illustrated to the right of the main-discharge firing time $t_1$ in FIG. 18.

In selecting parameters of a PFN as shown in FIGS. 15 and 17, it is desirable to take advantage of some voltage amplification that is available, as voltage requirements upon the power supply 161 are accordingly moderated. Following is an analysis of this voltage-gain technique.

While we believe it is novel to divide the output capacitance C4 in a PFN into two discrete elements C2 and C3, to permit exciting of the main and preionization discharges by a single PFN, it is known to use or analyze a simplified single-capacitance circuit somewhat similar to that of FIG. 17 for operation as an excimer-laser PFN. Hence portions of the voltage-gain analysis below may be found in the literature.

Circuit analysis yields this expression for the positive output voltage $V_{c4}$ as a function of the negative input voltage $V_{HV}$ from the power supply 161 (neglecting the loading of the circuit by the laser-assembly discharge):

$$V_{C4} = -V_{HV} \cdot \frac{\alpha}{\alpha + 1} \cdot (1 - \cos \Omega t),$$

in which we define the
capacitance ratio $\alpha \equiv C1/C4$,
angular velocity $\Omega \equiv (LC)^{-\frac{1}{2}}$, and
lumped capacitance $C \equiv C1 \cdot C4/(C1+C4)$.

The equation shows that at time $t = \pi/\Omega$, the positive output voltage $V_{C4}$ rises to a peak value $-V_{HV} \cdot 2\alpha/(\alpha+1)$. This value exceeds the magnitude of the negative supply voltage $V_{HV}$—provided only that the capacitance ratio $\alpha > 1$.

Figure 21:
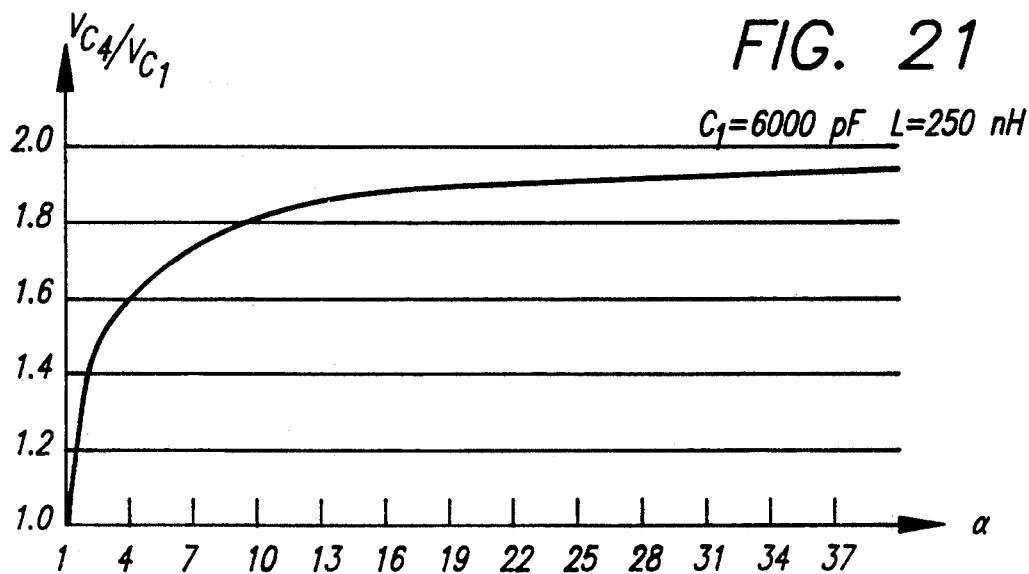
FIG. 21 is a representative graph showing how the FIG. 18 voltage across the lumped capacitance varies with the ratio of actual series capacitance of FIG. 17 to lumped capacitance.

More specifically, as that ratio $\alpha$ goes to infinity, the output voltage $V_{C4}$ asymptotically approaches $-2 \cdot V_{HV}$. FIG. 21 illustrates this relationship, showing in particular that over eighty percent of this voltage amplification (i.e., over ninety percent of the total available voltage) is obtained for $\alpha \geq 10$.

As a general matter caution must be employed in selecting $\alpha$, because the voltage increase is achieved at the expense of the photoelectric efficiency of the entire system—that is to say, the ratio of laser pulse energy to electrical power input. This fact can be appreciated by noting that increasing C1 relative to C4, for a given voltage level, requires increasing the energy input into C1 according to $E = \frac{1}{2}CV^2$—that is, in proportion to the increase in C1—whereas the energy transferred to the electrodes rises only asymptotically as in FIG. 21.

Furthermore the reverse current, corresponding to the negative voltage excursions in FIG. 18, will also increase in proportion to voltage. In some circuits such increase can reduce the lifetime of circuit components substantially.

Fortunately, as to a longitudinally discharged excimer laser in comparison with most transversely discharged ones, much lower electrical energy is processed, and the incremental cost of providing added power and heavier-duty circuit elements is not a primary obstacle. Therefore the desired voltage gain can be the main concern.

We accordingly select a combination of values of C1, C2 and C3 to make $\alpha$ approximately thirty—yielding (see FIG. 21) over ninety-five percent of the theoretically available output voltage.

The preionization voltage across C3 alone, while following a waveform generally similar to the graphed voltage across C4, is smaller—in inverse proportion to those capacitances, i.e. multiplied by the fraction $C4/C3 = C2/(C2+C3)$. The preionization corona discharge and the main glow discharge operate by different mechanisms, and the preionization voltage need not be as high as that for the main discharge. In addition, the preionization voltage must be limited so as not to exceed the breakthrough voltage of the mullite dielectric.

In light of these requirements, and taking into account the voltage amplification discussed above, we prefer to set the ratio $C4/C3$ to about $\frac{1}{3}$, so that the preionization voltage is about a third of the main-discharge voltage. This choice also establishes the ratio $C3/C2$ of the peak voltage capacitance C3 to that of the preionization coupler C2 at about two.

Figure 19:
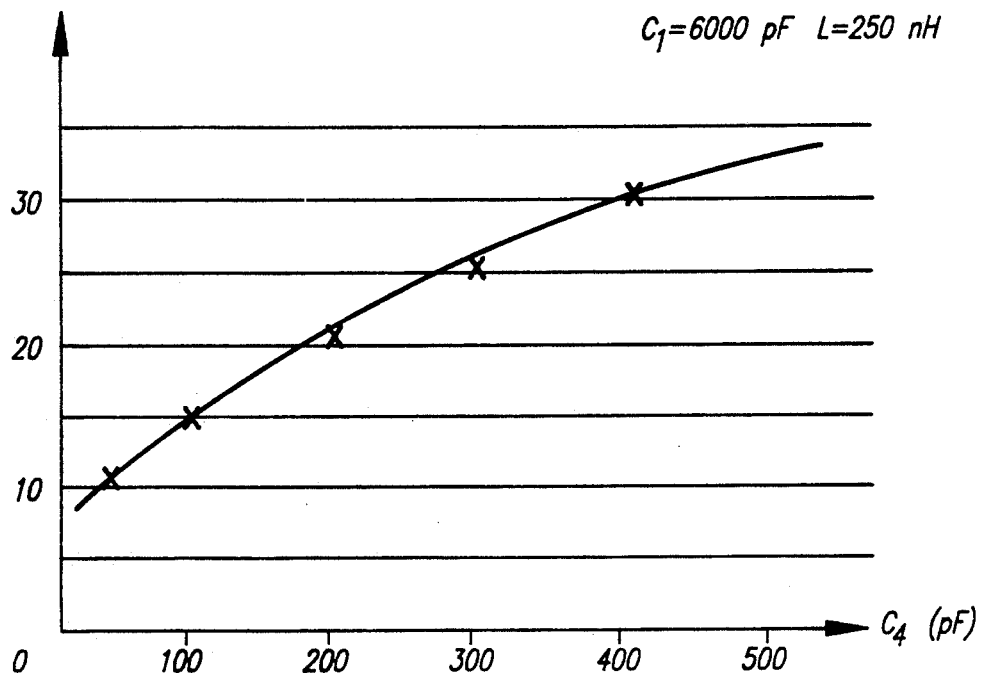
FIG. 19 is a representative graph showing how the FIG. 18 delay interval varies with the lumped output capacitance shown in FIG. 17.

In the simple LC circuit of FIG. 17, theoretically we can change either C1 and C4 or L to choose desired delay time and rise time $t_1-t_0$ as exemplified in FIG. 19. In that example C1 is held constant at 6000 picofarads and C4 is varied; as will be understood C1 can be varied instead or in addition.

Changing C1 or C4, however, also changes the voltage $V_{c4}$—as FIG. 17 makes clear to those skilled in the arts of electronic circuitry. We prefer to first determine C1 and C4, and in fact the individual capacitances C2 and C3 as well, and the ratios between them, to obtain desired output voltages as described above—and only then to optimize the delay (and rise time) $t_1-t_0$ by changing the trim inductor L1 to vary the overall timing inductance L as defined above.

Figure 20:
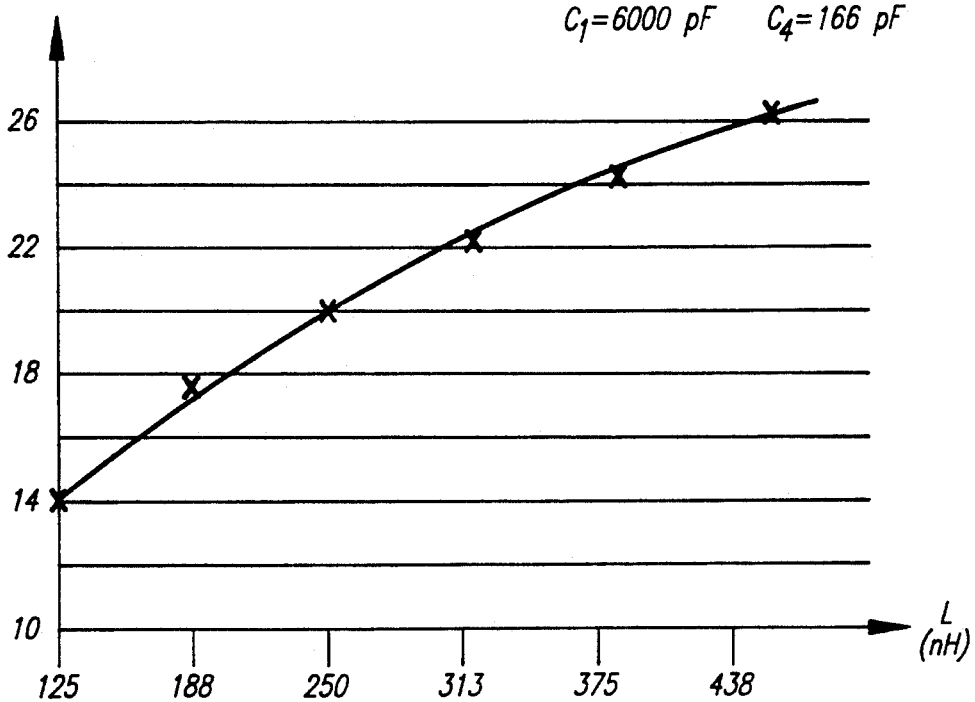
FIG. 20 is a representative graph showing how the FIG. 18 delay interval varies with the FIG. 17 inductance.

FIG. 20 shows how the delay and rise time $t_1-t_0$ will vary with total timing inductance L. If desired, the actual gap and intrinsic inductances in a new apparatus can be measured, and their sum subtracted from the values along the abscissa in FIG. 20 to yield new abscissa values representing the values of the needed trim inductor L1.

The needed inductance L1 can then be read from the graph (or calculated) for desired delay and rise time $t_1-t_0$. Preferably various small inductances (typically hand-wound coils of a few turns) can be inserted into the circuit to find one that yields an assumed optimal delay, or ideally one that yields observed optimal laser-pulse characteristics.

If the delay is too short, ion density in the preionization corona will not be as high as attainable by waiting longer. Resulting pulse energy too will typically be lower than attainable.

On the other hand, if rise time is too long—that is, if the voltage rises too slowly—three problems result. (1) The electrical field changes too slowly to produce adequate corona current. In addition, (2) the voltage overshoot above the SBV (see FIG. 18) does not have time to reach an optimum peak value before the discharge starts.

We prefer to select that peak voltage value for maximum laser-pulse energy from each discharge-tube assembly. To accomplish this, as is conventional in other excimer-laser systems, we take advantage of the intrinsic turn-on period of the discharge itself—the few nanoseconds between reaching of the SBV and actual commencement of the discharge—for upward coasting of the supply voltage to the elevated peak. Although SBV is typically twenty-five kilovolts, a typical discharge-starting voltage is closer to thirty-five kilovolts.

Furthermore, (3) during the associated added delay, recombination begins to counteract and eventually overcome addition of new ions. This wastes power in the preionization corona that could better be placed in the main discharge.

For our device, delay and rise time of twenty-five to thirty nanoseconds to the peak time $t_1$ produces optimal observed pulsing. This varies strongly, however, with geometry and even to some extent between nominally identical systems.

To avoid interfering with fast transfer of electrical energy from C2 and C3 to the laser, we prefer to connect the timing trim inductor L1 into the circuit outside that part of the discharge path, as shown in FIG. 15. Note that in thereby controlling the shape of the FIG.

18 waveform we control (1) the rate of voltage increase and thereby the preionization corona current, (2) the voltage-overshoot time available for the supply voltage to reach its optimum peak value, and (3) the relative delay between the preionization and main discharges.

Since the output coupling inductor L2 also has some small effect on the timing of the main discharge, the previously mentioned customized selection of the timing trimmer L1 is better performed after the main coupling inductor L2 is in place. Ideally, selection of both inductors L1, L2 can be iterated until the system performance is optimized.

Following are preferred values not previously stated for the other circuit elements of FIG. 15:

| high-voltage supply 161 | 20 to 35 kilovolts |
|---|---|
| resistors R1 | 50 kilohms |
| R2 | 20 kilohms |
| inductors L1 | 300 to 400 nanohenries |
| L2 | 10 to 25 nanohenries. |

Figure 22:
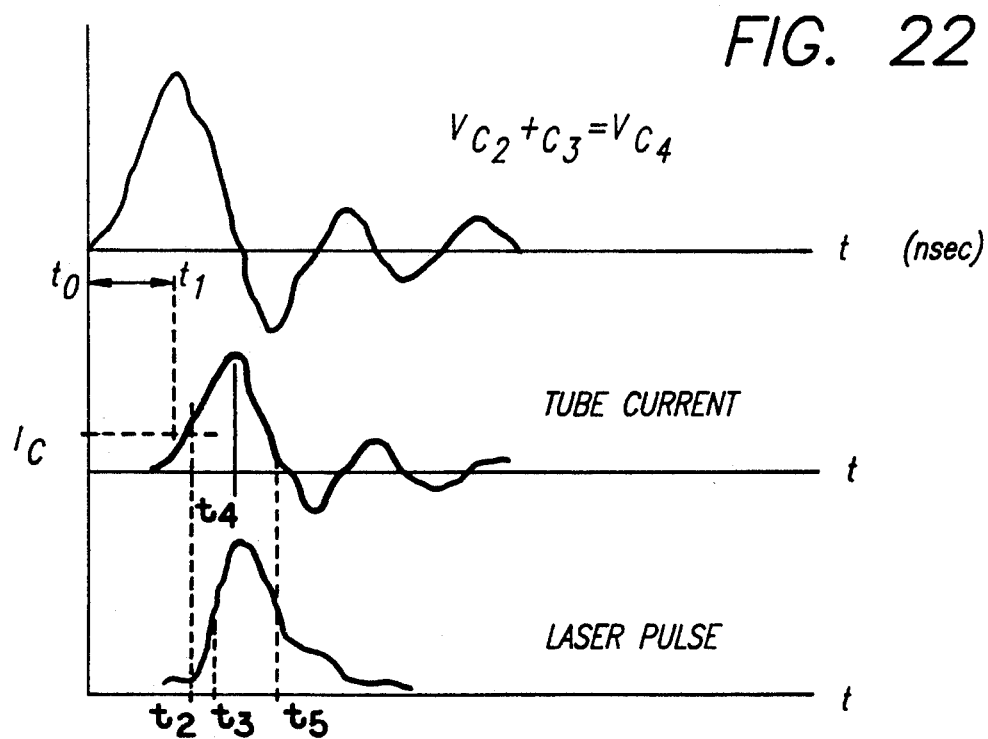
FIG. 22 is a representative timing diagram showing waveforms of (a) the voltage across the lumped capacitance, (b) the discharge-tube-assembly current, and (c) the laser pulse intensity.

FIG. 22 shows the resulting main-gas-discharge current and laser-pulse intensity in their temporal relationships with the output voltage in FIG. 18 (reproduced at the top of FIG. 22). As before, the startup time $t_0$ represents the beginning of the discharge of the storage capacitor C1. The preionization corona (not included in FIG. 22) begins shortly after that startup time $t_0$.

The current in the main discharge (second graph in FIG. 22) starts a few nanoseconds after the main output voltage—approximately $V_{C4}$—reaches the static breakdown voltage between the main-discharge electrodes; this discharge-ignition time $t_1$ is twenty-five to thirty nanoseconds after the startup time $t_0$. Five or ten nanoseconds later, as the discharge-tube-assembly current rises through some threshold value $I_c$, the lasing action (bottom graph in FIG. 22) begins; this laser-firing time $t_2$ is about thirty to forty nanoseconds after the startup time $t_0$.

Lasing action peaks generally with the main-discharge current, at a lasing-peak time $t_4$—roughly fifty to sixty nanoseconds after startup time $t_0$. The rising half-height time $t_3$ of the pulse may be defined as halfway between the firing and laser-peak times $t_2$ and $t_4$—or in other words about forty to fifty nanoseconds after the startup time $t_0$.

Lasing decays more slowly. It returns to its half-peak-height value at a decaying half-height time $t_5$, about seventy to ninety nanoseconds after the startup time $t_0$—just as the glow-discharge current reaches zero, and its first reversal time.

The half-height width of the pulse may accordingly be defined as extending between the rising and decaying half-height points $t_3$ and $t_5$. As so defined, the half-height width is thus about thirty to forty nanoseconds.

Figure 23:
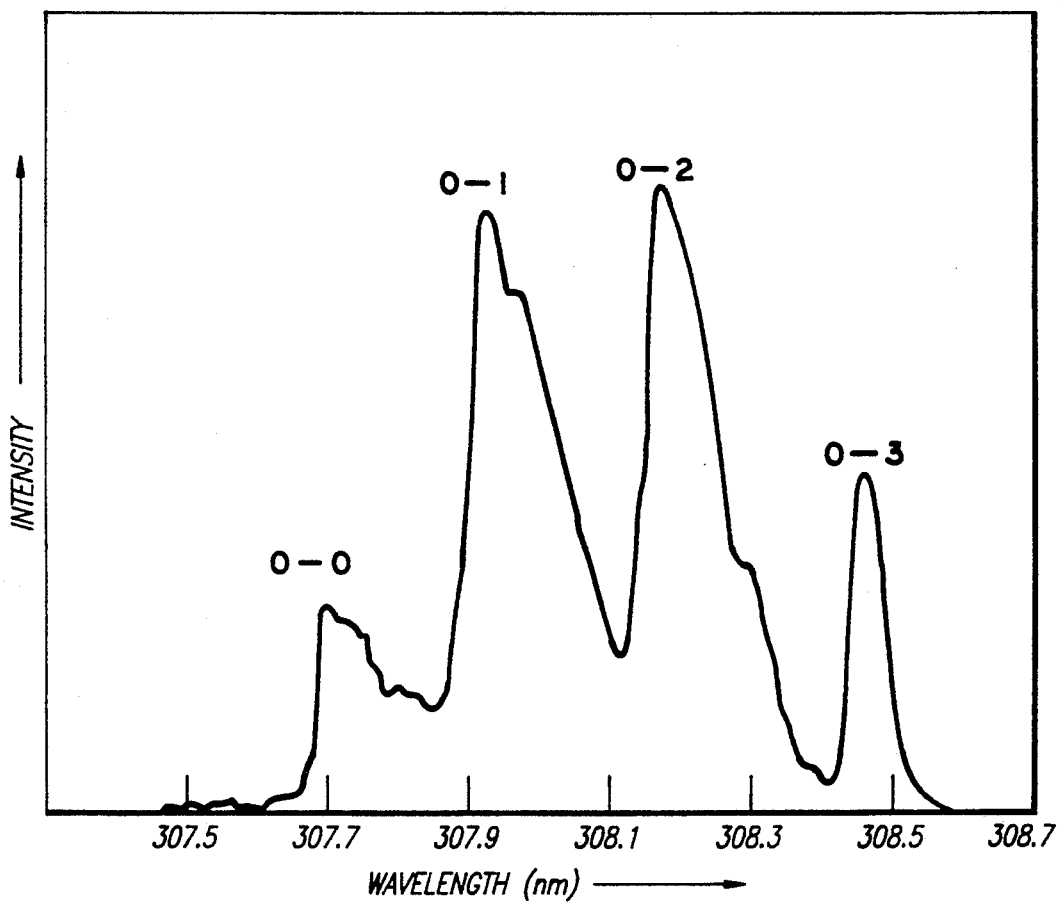
FIG. 23 shows the line structure of the "308 nm" emission line of a xenon-chloride excimer laser.

We have constructed several longitudinally discharged excimer lasers as described above, and operated them at the 308-nanometer line of xenon chloride—actually a multiple-transition cluster of lines as shown in FIG. 23. Many excellent applications of our excimer laser are amenable to operation at this wavelength.

Our invention, however, is by no means limited to operation at 308 nanometers. Indeed, excimers can be induced to lase at many transitions into the vacuum ultraviolet.

Such lines would provide even higher photon energy, and (given necessary adaptations discussed later) might be focused to working dimensions below about one-quarter micron. Such dimensions are likely to become of significant interest, in view of the perennially decreasing scale of integrated circuits and other articles of industrial or scientific interest.

Our laser described above is readily adaptable for such use by removal—or partial removal—of attenuating media in the beam path. Such media are primarily air and the constructional materials of the laser windows 15 (FIG. 7) and output mirror 55 (FIG. 1), and the attenuator 71 and achromat 73. Reflectances of certain elements such as the laser rear mirror 54 and dichroic elements 61, 74 may be significant.

As to the solid elements, even in the vacuum ultraviolet relatively little attenuation arises at the windows 15 and output mirror 55 as these are of quartz. Reflective and dichroic materials are readily selected for vacuum-ultraviolet operation; and if necessary the attenuator 71 may be omitted.

The achromat 73 may require redesign or replacement by a reflective element, within the capability of persons skilled in the art of optical design. For smallest spot size, a telescope may be substituted—as will be discussed shortly.

Oxygen strongly absorbs radiation of wavelengths below 250 nanometers, and particularly below 200. Accordingly, as is well known, for operation in the range of about 190 to 250 nanometers the optical system should be sealed to permit purging of ambient air from the optical system, and replacement by a relatively nonattenuating gas such as nitrogen. In most or many applications of our laser, such an arrangement should suffice for at least marginal operation at the 193-nanometer line or argon fluoride.

For higher energy at that wavelength—or for operation at still-lower wavelengths, such as for instance the 175-nanometer line of argon chloride—as implied by the term "vacuum ultraviolet" the optical system should be placed in a housing strong enough to be evacuated. Gas in the system should then be removed by attachment and operation of a vacuum pump.

In some cases the target to be irradiated by our laser may be simply placed inside the optical-system chamber, whether purged with relatively nonattenuating gas or pumped down. As a practical matter, availability of this option will depend upon several factors, including:

the relative bulkiness of operational and analytical equipment 122, 128 (FIG. 4) to be functionally interconnected with the target during irradiation by our laser;

the relative amenability of such equipment to operation within the chamber (particularly as to operational equipment 122), or via electrical or mechanical feedthroughs (as to analytical equipment 128); and the procedural inconvenience, to applications personnel, that would arise from the need to specially configure all such equipment 122, 127, 128 in preparation for the laser irradiation.

When the target cannot be placed with the optical system in the purged or evacuated chamber, it can be placed just outside that chamber by either of two strategies. First, the target can be placed very close to a chamber exit window—for example, an exit window at the bottom of the objective 75 (FIG. 1)—so that the beam pathlength through ambient air is very short, e.g., $2\frac{1}{2}$ to $3\frac{1}{2}$ millimeters. In many cases the attenuation in such a short path, and the possibility of interaction between the window and target, may be acceptable.

Figure 24:
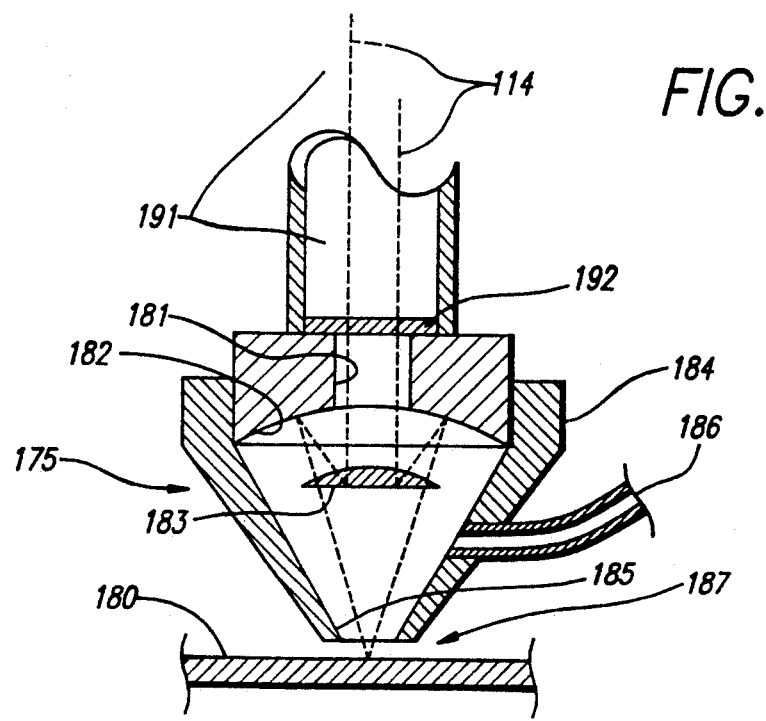
FIG. 24 shows an alternative objective-and-target configuration for use in vacuum-ultraviolet operation of our FIG. 1 embodiment.

Second, when even such minor attenuation is excessive, a coupling region between the sealed optical system and the unsealed target may be purged or evacuated as shown in FIG. 24. The sealed optical chamber 191 terminates at a quartz window 192 which in this configuration—unlike that discussed in the preceding paragraph—is sealed to the top of the modified objective 175.

Optically the objective 175 is generally conventional. A perforation 181 in a relatively large reflector 182 admits the laser beam 114 to a smaller collecting mirror 183—which reflects the radiation to the large element 182.

Focal functions are divided between the two mirrors 182, 183. Together they collect light over a relatively very large field into an extremely small image of the aperture 67 (FIG. 1) at the target 80, 180.

Our modified objective 175, however, includes a jacket 184 that makes a seal with the periphery of the larger reflector 182, and that is advantageously tapered to a small optical-outlet orifice 185. In addition the jacket 184 is fitted with a tubulation 186 that communicates with either a purge-gas supply or a fast vacuum pump, depending upon which strategy is better suited to the combination of the laser wavelength to be used and the energy requirements of the application at hand.

The orifice 185 is positioned at a very short spacing 187 just above—or in some cases even surrounding—the part of the target 180 to be irradiated. The possibility that the part of the target 180 to be irradiated may actually project upward into the nozzle aperture 185, and be partly encircled by it, depends upon the relative three-dimensional geometries of the aperture 185 and target 180.

Ambient air surrounds the objective 175, except at the area covered by the inlet window 192 and its mount, and the area controlled by gas flow through the optical-outlet orifice 185. Due to the small size of both the lower orifice 185 and gap 187, however, oxygen concentration is very low within the objective chamber 182-192-184.

That chamber is either well purged, or evacuated to a pressure in the range of perhaps ten torr down to a fraction of one torr. Accordingly very little attenuating gas remains in the path of the laser light, converging from the mirror 182 onto the target 180—particularly if the irradiated part of the target is effectively inserted into the lower orifice 185.

If preferred and permitted by the wavelength region to be used, a refracting UV objective may be substituted for that shown in FIG. 24. Resulting modifications to the foregoing description will be apparent to those skilled in the art.

Following are some preferred dimensions, not mentioned earlier, for the excimer-laser apparatus disclosed in this document. All are stated in millimeters.

| discharge capillary 11: | |
|---|---|
| inside diameter 211 | 2 |
| outside diameter | 6 |
| length | 375 |
| metallic coatings 34-36, 134, 234, 334, 434: | |
| thickness | 0.1 |
| dielectric baffle panels 41-43: | |
| thickness | 4 |
| flange outside radius | 22 |

| -continued | |
|---|---|
| discharge-tube assembly end segments 14: | |
| outside diameter | 9 |
| inside diameter | 8 |
| average length | 60 |
| reservoir tubulations 22, 222: | |
| outside diameter | 8 |
| inside diameter: first 2 cm above anode chamber | 1 |
| remainder of both tubulations | standard |
| overall length | 60 |
| annular main electrodes 31, 231: | |
| annular thickness | 0.13 |
| diameter | 25 |
| length | 20 |
| recess distance* | 6 to 7* |
| main-electrode chambers 12, 212: | |
| outside diameter | 32 |
| wall thickness | standard |
| overall outside length | 40 |
| interchamber spacing | 370 |
| inside diameter of orifice to end segments 14 | 3.5 |

This is the spacing of (1) the electrode 31, 231 end near the discharge, back from (2) the extreme forward end of the seal between the chamber 12, 212 and capillary 11. For the two chambers 12, 212, the distance between the two points "(2)" equals the "interchamber spacing". "Overall outside length" of each chamber includes distance to point "(2)".

The terms "tube" and "discharge tube" in this document, and particularly for purposes of the appended claims, mean the capillary 11. We thereby intend to distinguish the discharge-tube assembly 10, reservoir 20, and gas enclosure 10-20. Some exceptions appear in prior-art quotations and discussion.

The gas filling of the gas enclosure 10, 20 is a mixture of hydrogen chloride, xenon and neon, to a total pressure of about 800 torr. Operation and particularly the energy and cross-sectional uniformity of the laser pulse are extremely sensitive to the gas mix, which we believe should be optimized for each discharge-tube assembly—as noted in step 12 of the fabrication procedure presented earlier.

More specifically, operation is extremely sensitive to the amount of hydrogen chloride, which we therefore adjust for maximum energy very carefully. We believe that this procedure must be given the greatest of attention, never performed perfunctorily or absent-mindedly.

After adjustment, hydrogen chloride constitutes between 0.09 and 0.12 percent of the total. The correct concentration is quite critical, far more so than in transversely discharged excimer lasers—in which a relatively small pulse-energy increment may not be as important.

During work on our invention we at first believed that inadequately low vacuum, before fill, and inadequate cleaning of the discharge-tube assembly, were largely responsible for poor or nonreproducible pulse energy. Although passivation history of the discharge-tube assembly, and also the glass-blower's work as to detailed spacing between the various components, do have major effects on system performance, in our present view the most critical single factor remains the hydrogen-chloride concentration.

To optimize the pulse energy we observe very carefully the system performance during its first preliminary operation—in step 11 of the passivation procedure described earlier. In particular the relationship between voltage and laser-pulse energy provide information needed for final hydrogen-chloride pressure adjustment, as follows.

For our excimer laser the normal main-discharge operating voltage is twenty-five to thirty-five kilovolts. In some new discharge-tube assemblies, however, when the voltage is first raised toward this range, operation begins at a lower value—twenty kilovolts, for example—and peaks at thirty, with laser-pulse energy clearly lower than the usual.

Almost always in this case, the concentration of hydrogen chloride is too low: we have observed that raising it by 0.02 to 0.03 percent, depending upon the degree of departure from the more normal pattern, generally improves the pulse-energy performance very greatly.

Conversely, some new discharge-tube assemblies fail to fire at the more normal voltage, but rather only start at higher voltages such as thirty kilovolts. In these particular discharge-tube assemblies, when the voltage is increased past thirty-five kilovolts the laser-pulse energy continues to rise—perhaps toward a maximum at forty kilovolts.

For life of the electrical system and the discharge-tube assembly as well, we prefer not to operate at such high voltage. Moreover, the beam cross-section in these discharge-tube assemblies tends toward an annular pattern, rather than being generally uniform as preferred.

Almost always in this case, the hydrogen-chloride concentration is too high: we have observed that lowering it by 0.02 to 0.03 percent generally improves the pulse-energy performance and beam cross-section very greatly.

The foregoing procedure usually also optimizes reproducibility. In the final gas fill, xenon accounts for approximately two percent of the mixture; the remainder is neon, used as a carrier or buffer gas.

Before beginning the making of the present invention, one of its three coinventors had some six years of experience in the theory, analysis, design and construction of excimer lasers—and as noted earlier had led the research group in Shanghai. At the time of first conception of the present invention, moreover, he and the other coinventors had at their disposal essentially all of the literature discussed in the "BACKGROUND" section of this document.

Despite these advantages, completion of the invention required two full years of diligent effort. For example, in our early apparatus, laser output was typically only about 180 microjoules, with pulse-to-pulse repeatability or reproducibility exceeding plus-or-minus fifty percent.

Among our first few production units, by contrast, pulse energy ranged from about 370 to about 450 microjoules, with average reproducibility very roughly plus-or-minus seven percent. At the same time, uniformity of power distribution across the laser beam was very conspicuously improved.

Moreover the optimum value of E/P, the voltage gradient per unit pressure inside the discharge-tube assembly, was decreased to approximately seventy percent of the early values, and so was the optimum operating voltage. This improvement eased the high-voltage insulation requirements for the entire laser system and also improved the operating lifetime and reliability of all the high-voltage electrical components.

Successful completion of the invention required exploring many different factors affecting pulse energy and reproducibility, and gas purity and lifetime. That effort in fact included several experimental paths which appeared promising but proved fruitless or at least not clearly economic.

It thus is only as a result of these years of work that we have succeeded in acquiring the added knowledge and experience needed to reduce our invention to practice, and have thus become the first to realize an excimer-laser system according to the appended claims.

This new system has already been found especially useful in spot depassivation for electron-beam and mechanical probing. The fundamental reason is that, unlike all other lasers (which are photothermal in material interaction), excimer lasers operate by ablative photodecomposition.

Our excimer laser therefore dissociates most thin-film materials without creating a residue or thermally damaging silicon or glass substrates, even particularly sensitive supports such as gallium arsenide. Laser drilling of passivation is especially selective, with respect to metal layers below.

Figure 25:
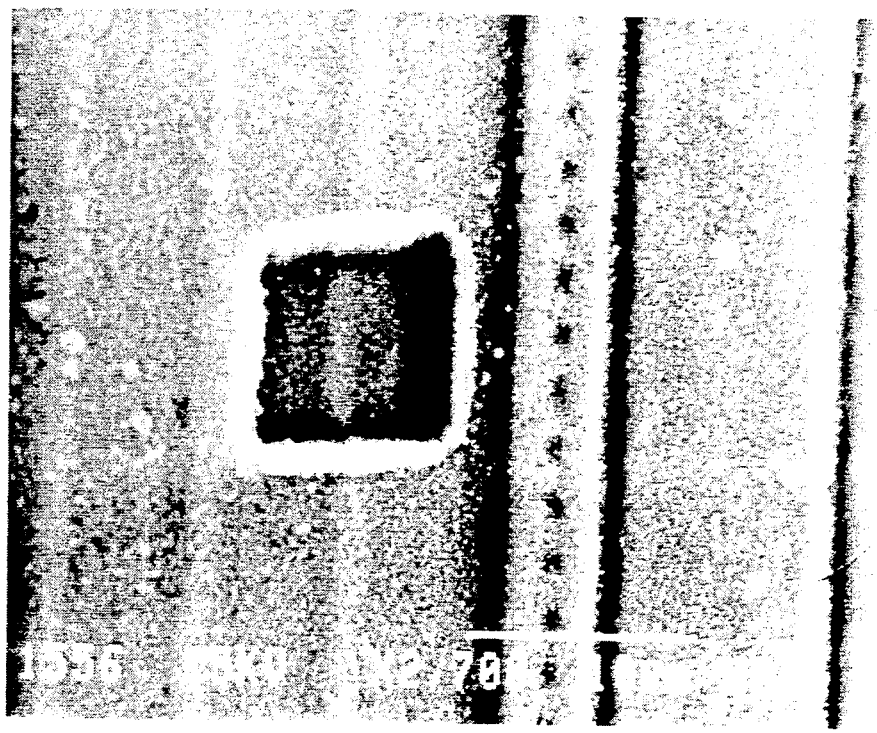
FIG. 25 is a reproduction of a photomicrograph showing a portion of an actual integrated circuit in which nitride passivation has been removed by three pulses of radiation from our system, without affecting the polysilicon underlayer.

Perhaps most remarkably, our laser has depth control, reducing passivation by about 0.2 micron or even less per laser pulse. It can thus be used to cut or stop at any layer without damage to the next—as shown in FIG. 25, where nitride was removed in three shots, over a roughly square area ten microns on a side, without affecting a polysilicon underlayer.

We have also removed two passivation layers—silicon oxide and nitride—in five shots, opening a rectangular window about seven by ten microns to a gold line serving as an integrated-circuit pathway for conduction of electricity. As other examples, we have removed second-layer aluminum and nitride, exposing first-layer aluminum on a silicon substrate, over various-sized areas—including one ten microns square, and another only about five microns in diameter—each in two shots, the second being a weak shot for cleaning.

Electron-beam probers and analytical probe stations are thus enhanced by this stand-alone unit. It can be used also in metal removal for circuit isolation, hole drilling in polyimide, insulation wire stripping, fiber-optic cladding removal, and photomask repair.

Figure 26:
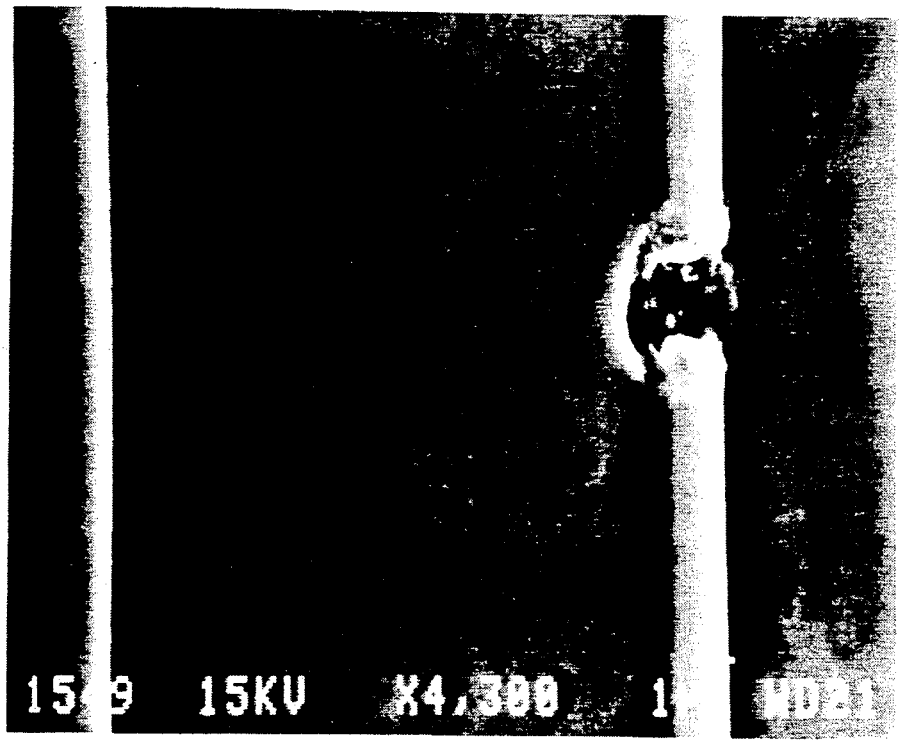
FIG. 26 is a like reproduction showing a portion of an actual integrated circuit in which a silicon-oxide-passivated circuit connection—a gold strip, 1.3 micron (micrometer) wide—has been severed by a single pulse of laser radiation from our laser system.

Our laser produces surprisingly sharp cuts without debris, as shown in FIG. 26—where a silicon-oxide-passivated gold line, an electrical-conduction pathway 1.3 micron wide on a gallenium-arsenide substrate, has been severed in a single shot.

We have also severed a similar pathway, a seven-micron-wide gold line in one shot. As another example, in three shots we have opened a generally square hole about seven microns on each side, through three levels (first silicon oxide, then gold and finally nitride) to reach without disturbing the top of a first gold layer on gallium arsenide.

The achromat 73 and objective 75 in our system permit imaging of small, variably masked-down fractions of the aperture—but do not provide the smallest possible spot. If we replaced the achromat by a telescope to reduce beam divergence (a known prefocal technique to minimize diffraction effects), we might obtain a circular spot as small as about one-quarter micron in diameter at 308 nanometers, or perhaps even less at shorter wavelengths; in such a system, however, the spot-shaping and spot-marking features may not be possible.

With all electronics, optics and target stage, our entire system weighs less than 500 pounds. It operates on only five amperes at 115 Vac, fifty or sixty hertz.

The foregoing parts of this document are directed to persons skilled in the arts of laser and related electronic design, in roles such as those of technician or junior designer; and are intended to enable them to practice our invention without further inventive contributions. In the next few paragraphs we very briefly depart from that approach, to provide guidance for more-advanced workers—in uses of our invention more remote from the arrangements specifically described. Here too, however, we intend to enable practice of our invention without further creative work.

The following tabulation, taken from the literature, shows known lasing wavelengths W and the corresponding lifetimes times $\tau$ of the elevated species. Some of the known operating wavelengths are marked in the table with an asterisk (*).

Entries in the column headed "transition" indicated the energy levels involved in producing the tabulated wavelengths. In physics notation, "B" is a shorthand for "$R+X^-(^2\Sigma)$"—which describes a strongly bound/ionic state in which the species behaves similarly to an alkali halide.

The shorthand "X" represents the energy level "$RX(^2\Sigma)$", a weakly attractive/covalent level that is thermally unstable; and "C" stands for "$R+X^-(^2\pi)$"—a state similar to the B level, merging with it for high interatomic distances, but is slightly higher for smaller distances. The letter "A" represents "$RX(^2\pi)$"—a strongly repulsive/covalent state.

| | | halogen | | | | | | | |
|---|---|---|---|---|---|---|---|---|---|
| | | fluorine F | | chlorine Cl | | bromine Br | | iodine I | |
| rare gas | tran- si- tion | W (nm) | $\tau$ (ns) | W (nm) | $\tau$ (ns) | W (nm) | $\tau$ (ns) | W (nm) | $\tau$ (ns) |
| Xe | B→X | 351* | 12–19 | 308* | 11 | 282* | 12 | 253 | 12 |
| | C→A | 450* | 93, 113 | 350 | 120 | 302 | 120 | 263 | 110 |
| Kr | B→X | 249* | 6.5–9 | 222* | | 206 | | | |
| | C→A | 275 | 63 | | | | | | |
| Ar | B→X | 193* | 4.2 | 175* | | | | | |
| | C→A | 203 | 48 | 199 | | | | | |
| Ne | B→X | 108 | 2.6 | | | | | | |
| | C→A | 117 | 38 | | | | | | |

In theory both B→X and C→A transitions are possible, but in practical operation so far the active gas systems exhibit predominantly B→X emission. The reasons for this difference could become of great practical interest if the particular wavelengths or lifetimes of one or more C→A transitions are found to have particular utility for specific applications. Practical interest could also develop, for example, because use of the C→A transition is a possible way to make an excimer laser that is tunable.

Among various reasons that have been proposed: (1) Since the B state is a strongly bound one, it is most likely for excimer molecules in different upper electronic or vibrational states to be transferred to the B state. Usually the coupling times are less than ten nanoseconds. This situation favors good energy extraction from such systems by funnelling a substantial part of excitation energy through the B state.

(2) For C→A transition, the lower state exhibits no local energy minimum and its emission range is much wider. This implies a correspondingly lower gain, about one order of magnitude compared with B→X transitions. Therefore for C→A transitions, excitation in a direct-discharge pump is not adequate for output at practical energy or power. Our invention as recited in certain of the appended claims encompasses use of more energetic and powerful pumping mechanisms, such as for example an electron-beam device.

(3) For B→X bands, the stimulated emission cross-section $\sigma$ (determined by wavelength, bandwidth, radiative-decay times, etc.) is in the range of 2 to $5 \cdot 10^{-16}$ cm$^2$; but that for C→A bands is much smaller, e.g. $5 \cdot 10^{-18}$ cm$^2$ for xenon fluoride.

These various considerations may be helpful to advanced personnel seeking to apply our invention for use in C→A transitions. The table above shows that even B→X excimer-laser wavelengths are available into the vacuum ultraviolet, for use with our vacuum-ultraviolet target system presented earlier.

As will be understood, the foregoing disclosure is meant as merely exemplary, not to limit the scope of the invention—to be determined by reference to the appended claims.

We claim:

1. An excimer-laser system exclusively for low-average-power applications; said system comprising:
   a gas enclosure that includes: (1) a discharge tube and (2) a gas reservoir in communication with the discharge tube;
   said gas enclosure having no communication with anything selected from the group consisting of a gas pump, gas-exhaust means, any valve that leads to air outside the enclosure, any valve that leads to a gas pump, and any valve that leads to gas-exhaust means;
   gases sealed within the enclosure that form an excimer when excited;
   means for exciting the gases in the discharge tube to form an excimer that lases, producing low-average-power radiation; and
   means for extracting the low-average-power laser radiation from the discharge tube into exclusively any one or more low-average-power applications selected from the group consisting of integrated-circuit failure analysis, spectroscopy, sensing, diagnostics, and laser-amplifier second stages.

2. The system of claim 1, wherein:
   the system has an extended life, without replenishment of the gases, of at least one year after the gases are sealed within the enclosure, at least in intermittent use at average power less than four milliwatts.

3. The excimer-laser system of claim 2, wherein:
   the enclosure is substantially all of materials selected exclusively from the group consisting of glass, silica and ceramic;
   whereby the length of said useful life is enhanced.

4. The excimer-laser system of claim 3, further comprising:
   relatively small components such as electrodes, fittings, valves and seals; said components being at least partly exposed within the enclosure;
   said relatively small components being substantially all of materials selected exclusively from the group consisting of tungsten and tantalum, and like metals; polytetrafluoroethylene and fluorocarbon; and low-vapor-pressure resin;
   whereby the length of said useful life is enhanced.

5. The excimer-laser system of claim 4, wherein:
   all of said relatively small components that are of polytetrafluoroethylene or fluorocarbon are in portions of the enclosure relatively remote from the excited gases;
   whereby the length of said useful life is enhanced.

6. The excimer-laser system of claim 5, wherein:

the enclosure is sealed off by a substantially permanent type of seal;

whereby the system can be reliably handled and transported without compromising the length of said useful life.

7. The excimer-laser system of claim 6, wherein:

any valve that is exposed within or extending into the enclosure is sealed off by said substantially permanent type of seal against communication outside the enclosure with ambient air or with any gas pump or exhaust.

8. The excimer-laser system of claim 3, wherein:

the enclosure is sealed off by a substantially permanent type of seal.

9. The excimer-laser system of claim 2, wherein:

the enclosure is sealed off by a substantially permanent type of seal.

10. The laser system of claim 2, wherein:

the gas-exciting means comprise means for forming a longitudinal electrical discharge in the discharge tube.

11. The excimer-laser system of claim 2, wherein the gas-exciting means comprise:

preionization means for establishing a transverse electrical discharge in the discharge tube to preionize the gases with a generally uniform ion density throughout the discharge tube; and main-discharge means for establishing a longitudinal electrical discharge in the preionized gases substantially throughout the discharge tube and with relatively low voltage;

whereby said relatively low voltage enhances the length of said useful life.

12. The excimer-laser system of claim 11, wherein:

the preionization means comprise preionization electrodes outside the discharge tube, capacitively coupled through the discharge tube to the gases inside the tube; and the tube has a wall that separates the gas inside the tube from the electrodes outside the discharge tube;

whereby the tube wall prevents contact, and therefore chemical reaction, between the preionization electrodes and the gases in the tube.

13. The excimer-laser system of claim 2, wherein:

the means for exciting the gases within the discharge tube to form an excimer that lases comprise:

preionization electrodes outside the discharge tube, generally on opposite sides of the discharge tube along substantially the entire discharge tube, capacitively coupled through the discharge tube to the gases for establishing a transverse electrical discharge in the discharge tube to preionize the gases in the discharge tube substantially throughout the discharge tube, and main-discharge means for establishing a longitudinal electrical discharge in the preionized gases substantially throughout the discharge tube and with relatively low voltage; and the discharge tube has a wall that separates the gas inside the discharge tube from the electrodes outside the discharge tube;

whereby the discharge-tube wall prevents contact, and therefore chemical reaction, between the preionization electrodes and the gases in the discharge tube;

whereby the longitudinal electrical discharge is established substantially throughout the discharge tube and with relatively low voltage; and whereby such reaction prevention and such relatively low voltage enhance the length of said extended useful life.

14. The excimer-laser system of claim 2, wherein, to enhance the length of said extended useful life:

the enclosure is substantially all made of materials selected exclusively from the group consisting of glass, silica and ceramic;

the system further comprises relatively small components such as electrodes, fittings, valves and seals; and said relatively small components are at least partially exposed within the enclosure;

said relatively small components are substantially all of materials selected exclusively from the group consisting of tungsten and tantalum, and like metals; polytetrafluoroethylene or fluorocarbon; and low-vapor-pressure resin;

all of said relatively small components that are of polytetrafluoroethylene or fluorocarbon are in portions of the enclosure relatively remote from the excited gases;

the enclosure is sealed off by a substantially permanent seal, whereby the system can be reliably handled and transported without comprising the length of said extended life;

any valve that is at least partly exposed within the enclosure is sealed off by said substantially permanent seal against communication with everything selected from the group consisting of: air outside the enclosure, and any gas pump, and any gas-exhaust means;

the enclosure materials, and the materials of components that are at least partly exposed within the enclosure, substantially exclude nickel and stainless steel;

the gas-exciting means comprise preionization electrodes generally along opposite sides of the exterior of substantially the entire discharge tube and isolated from chemical reaction with the gases in the discharge tube, and capacitively coupled through the discharge tube to the gases, to establish within the discharge tube a transverse electrical discharge of generally uniform ion density;

the gas-exciting means further comprise main-discharge means for establishing a longitudinal electrical discharge in the preionized gases substantially throughout the discharge tube and with relatively low voltage.

15. The excimer-laser system of claim 14, wherein:

the system further comprises laser mirrors outside the discharge tube; and the discharge tube has a wall that separates the gas inside the discharge tube from the laser mirrors outside the discharge tube;

whereby the discharge-tube wall prevents contact, and therefore chemical reaction, between the coatings on the mirrors and the gases in the discharge tube.

16. The excimer-laser system of claim 14, wherein:

the reservoir volume is at least several hundred times the discharge-tube volume.

17. The excimer-laser system of claim 14, wherein:

the reservoir volume is on the order of a thousand times the discharge-tube volume.

18. The system of claim 1, wherein:

the system has an an extended life, without replenishment of the gases, after the gases are sealed within the enclosure, at least in intermittent use at average power less than four milliwatts.

19. An excimer-laser system exclusively for low-average-power applications; said system comprising:
a gas enclosure that includes: (1) a discharge tube and (2) a gas reservoir in communication with the discharge tube;
said gas enclosure having no communication with anything selected from the group consisting of a gas pump, gas-exhaust means, any valve that leads to air outside the enclosure, any valve that leads to a gas pump, and any valve that leads to gas-exhaust means;
gases sealed within the enclosure that form an excimer when excited;
means for exciting the gases in the discharge tube to form an excimer that lases, producing low-average-power radiation; and
means for extracting the low-average-power laser radiation from the discharge tube into exclusively one or two low-average-power applications selected from the group consisting of; sensing and diagnostic;
wherein the system has a useful life, without replenishment of the gases, of at least one year after the gases are sealed within the enclosure, at least in intermittent use at average power less than four milliwatts;
means for supporting a target that is effectively susceptible to low-average-power laser radiation; and
means for directing and applying the extracted laser radiation to said target that is effectively susceptible to low-average-power laser radiation.

20. The laser system of claim 19, wherein:
the gas-exciting means comprise means for forming a longitudinal electrical discharge in the discharge tube.

21. An excimer-laser system exclusively for low-average-power applications; said system comprising:
a gas enclosure that includes: (1) a discharge tube and (2) a gas reservoir in communication with the discharge tube;
said gas enclosure having no communication with anything selected from the group consisting of a gas pump, gas-exhaust means, any valve that leads to air outside the enclosure, any valve that leads to a gas pump, and any valve that leads to gas-exhaust means;
gases sealed within the enclosure that form an excimer when excited;
means for exciting the gases in the discharge tube to form an excimer that lases, producing low-average-power radiation; and
means for extracting the low-average-power laser radiation from the discharge tube into a low-average-power application, namely integrated-circuit failure analysis;
wherein the system has a useful life, without replenishment of the gases, of at least one year after the gases are sealed within the enclosure, at least in intermittent use at average power less than four milliwatts;
means for supporting an integrated circuit to receive the extracted laser radiation; and
means for directing and applying the extracted laser radiation to a component of the integrated circuit or to an electrical conductor of the integrated circuit, said component or conductor being one which is affected, or which has a covering that is removed, by the low-average-power radiation;
wherein failure of the integrated circuit is analyzed by evaluation before and after said component or conductor is affected or its covering removed.

22. An excimer-laser system exclusively for low-average-power applications; said system comprising:
a gas enclosure that includes: (1) a discharge tube and (2) a gas reservoir in communication with the discharge tube;
said gas enclosure having no communication with anything selected from the group consisting of a gas pump, gas-exhaust means, any valve that leads to air outside the enclosure, any valve that leads to a gas pump, and any valve that leads to gas-exhaust means;
gases sealed within the enclosure that form an excimer when excited;
means for exciting the gases in the discharge tube to form an excimer that lases, producing low-average-power radiation; and
means for extracting the low-average-power laser radiation from the discharge tube into a low-average-power application, namely spectroscopy;
wherein the system has a useful life, without replenishment of the gases, of at least one year after the gases are sealed within the enclosure, at least in intermittent use at average power less than four milliwatts;
means for supporting a specimen having a characteristic which interacts with laser radiation to produce a signal related to said characteristic; and
means for directing and applying the extracted low-average-power laser radiation to said specimen; and
means for monitoring the signal to determine said characteristic.

23. The laser system of claim 22, wherein:
the signal is electromagnetic radiation from the specimen; and
the monitoring means comprise a sensor that detects the signal and develops an electrical signal that carries information related to the specimen characteristic to be determined; and
means for processing the signal and displaying the information.

24. The laser system of claim 23, wherein:
the electromagnetic radiation from the specimen is fluorescence from the specimen.

25. The laser system of claim 23, wherein:
the electromagnetic radiation from the specimen is a beam of said laser radiation selectively attenuated by the specimen.

26. The excimer-laser system of claim 25, wherein:
the seal is a glassblown seal.

27. An excimer-laser system exclusively for low-average-power applications; said system comprising:
a gas enclosure that includes: (1) a discharge tube and (2) a gas reservoir in communication with the discharge tube;
said gas enclosure having no communication with anything selected from the group consisting of a gas pump, gas-exhaust means, any valve that leads to air outside the enclosure, any valve that leads to a gas pump, and any valve that leads to gas-exhaust means;

gases sealed within the enclosure that form an excimer when excited;

means for exciting the gases in the discharge tube to form an excimer that lases, producing low-average-power radiation; and means for extracting the low-average-power laser radiation from the discharge tube into a low-average-power application, namely a laser-amplifier second stage;

wherein the system has a useful life, without replenishment of the gases, of at least one year after the gases are sealed within the enclosure, at least in intermittent use at average power less than four milliwatts;

means for supporting a laser-amplifier second stage to receive the extracted radiation; and means for directing and applying the extracted low-average-power laser radiation to pump the laser-amplifier second stage.

28. An excimer-laser system exclusively for low-average-power applications; said system comprising:

a gas enclosure that includes (1) a discharge tube and (2) a gas reservoir in communication with the discharge tube;

said gas enclosure having no communication with anything selected from the group consisting of: gas-exhaust means, any valve that leads to air outside the enclosure, and any valve that leads to gas-exhaust means;

gases sealed within the enclosure that form an excimer when excited;

means for exciting the gases in the discharge tube to form an excimer that lases, producing low-average-power radiation; and means for extracting the low-average-power laser radiation from the discharge tube into exclusively any one or more low-average-power applications selected from the group consisting of integrated-circuit failure analysis, spectroscopy, sensing, diagnostics, and laser-amplifier second stages;

the enclosure being sealed off by a substantially permanent seal, whereby the system can be reliably handled and transported without compromising its life.

29. The system of claim 28, wherein:

the system has an extended life, without replenishment of the gases, of at least one year after the gases are sealed within the enclosure, at least in intermittent use at average power less than twenty milliwatts.

30. The system of claim 28, wherein:

the system has an an extended life, without replenishment of the gases, after the gases are sealed within the enclosure, at least in intermittent use at average power less than four milliwatts.

31. An excimer-laser system comprising:

a discharge tube;

within the discharge tube, gases for forming an excimer when excited;

means for preionizing the gases with substantially uniform ion density along the discharge tube;

main-discharge means for establishing a longitudinal electrical discharge in the preionized gases, substantially throughout the discharge tube, to excite the preionized gases and so form from the preionized gases an excimer that lases; and means for extracting laser radiation from the discharge tube.

32. The excimer-laser system of claim 31, wherein the uniform-preionizing means comprise:

preionization electrodes, longitudinally extended and substantially continuously disposed along the discharge tube, for establishing in the discharge tube a transverse electrical discharge that is substantially uniform along the discharge tube; and a source of high electrical voltage operatively interconnected with the preionization electrodes.

33. The excimer-laser system of claim 32, wherein:

the preionization electrodes are exclusively outside the discharge tube and are capacitively coupled through the discharge tube to the gases.

34. The excimer-laser system of claim 33, wherein:

the preionization electrodes are disposed generally on opposite sides of the discharge tube along substantially the entire discharge tube.

35. The excimer-laser system of claim 31, wherein the uniform-preionizing means comprise:

preionization electrodes disposed along exclusively the outside of the discharge tube and capacitively coupled through the discharge tube to the gases.

36. An excimer-laser system comprising:

a discharge tube having a length, a wall and an interior;

gases within the discharge-tube interior for forming an excimer when excited;

preionization electrodes disposed exclusively outside the discharge-tube interior, generally at opposite sides of the discharge tube along substantially the entire length of the discharge tube, and capacitively coupled through at least part of the discharge-tube wall to the gases, for establishing a transverse electrical discharge in the discharge-tube interior to preionize the gases;

a source of high electrical voltage operatively interconnected by electrical leads with the preionization electrodes;

main-discharge means for establishing a longitudinal electrical discharge in the preionized gases, to form from the preionized gases an excimer that lases; and means for extracting laser radiation from the discharge tube.

37. The excimer-laser system of claim 36, wherein:

the preionization electrodes are thin metallic coatings on the discharge tube.

38. The excimer-laser system of claim 37, wherein:

the preionization electrodes on opposite sides of the discharge tube are insulated from each other by a pair of relatively thick dielectric baffles that are secured directly to the discharge tube.

39. The excimer-laser system of claim 36, wherein:

the preionization electrodes on opposite sides of the discharge tube are insulated from each other by a pair of dielectric baffles that are secured to the discharge tube.

* * * * *